(12) United States Patent
Takla et al.

(10) Patent No.: US 11,019,803 B2
(45) Date of Patent: Jun. 1, 2021

(54) SYSTEM AND METHOD FOR MAINTAINING THE HYGIENE OF AN ANIMAL

(71) Applicant: Kimos Corp, Houston, TX (US)

(72) Inventors: Kamel A. Takla, Houston, TX (US); Robert S. Hudson, Austin, TX (US)

(73) Assignee: KIMOS CORP, Houston, TX (US)

( * ) Notice: Subject to any disclaimer, the term of this patent is extended or adjusted under 35 U.S.C. 154(b) by 240 days.

(21) Appl. No.: 15/876,843

(22) Filed: Jan. 22, 2018

(65) Prior Publication Data

US 2018/0139928 A1 May 24, 2018

Related U.S. Application Data

(63) Continuation-in-part of application No. 15/242,998, filed on Aug. 22, 2016, now Pat. No. 10,660,309.

(60) Provisional application No. 62/208,693, filed on Aug. 22, 2015, provisional application No. 62/448,444, filed on Jan. 20, 2017.

(51) Int. Cl.
*A01K 13/00* (2006.01)

(52) U.S. Cl.
CPC .......... *A01K 13/001* (2013.01); *A01K 13/003* (2013.01)

(58) Field of Classification Search
CPC .. A01K 13/001; A01K 13/003; A01K 27/007; A01K 13/002; A47L 9/2847; A46B 11/0062; A46B 9/023; A46B 11/06; A46B 11/063; A46B 11/066; A46B 11/08
USPC .......... 15/344, 345, 363, 364, 383, 385, 320
See application file for complete search history.

(56) References Cited

U.S. PATENT DOCUMENTS

| | | | |
|---|---|---|---|
| 3,386,185 A | 6/1968 | Angelillo | |
| 3,755,850 A * | 9/1973 | Porter | A47L 11/4086 15/320 |
| 4,817,234 A * | 4/1989 | Greulich | A47L 9/2805 15/339 |
| 5,649,502 A | 7/1997 | Frank | |
| 6,367,421 B1 | 4/2002 | Deacon | |
| 6,718,913 B1 | 4/2004 | Stupar | |
| 7,225,758 B1 | 6/2007 | Galloway | |
| 7,926,492 B2 | 4/2011 | Hurwitz | |
| 8,006,647 B2 | 8/2011 | Raber | |
| 8,336,558 B2 | 12/2012 | Hurwitz | |
| 8,418,654 B2 | 4/2013 | Hurwitz | |
| 8,550,376 B2 | 10/2013 | Munn et al. | |
| 8,555,819 B1 | 10/2013 | McFarland | |

(Continued)

FOREIGN PATENT DOCUMENTS

| | | |
|---|---|---|
| WO | 2008/029647 A1 | 3/2008 |
| WO | 2018/038969 A2 | 3/2018 |

OTHER PUBLICATIONS

International Search Report issued in corresponding Application No. PCT/US2017/046923, dated Jan. 12, 2018 (4 pages).

(Continued)

*Primary Examiner* — Trinh T Nguyen
(74) *Attorney, Agent, or Firm* — Chamberlain, Hrdlicka, White, Williams & Aughtry

(57) ABSTRACT

An animal cleaning device for grooming an animal. The animal cleaning device may include a top portion that includes a plurality of actuators and a bottom portion affixed to the top portion. The bottom portion may include a suction vent, a blow vent, a heated airflow vent, a rotating brush, and a formulation dispenser.

18 Claims, 17 Drawing Sheets

(56) References Cited

U.S. PATENT DOCUMENTS

| | | |
|---|---|---|
| 9,220,237 B1 | 12/2015 | Dryden |
| 9,278,054 B2 | 3/2016 | Avery et al. |
| 2003/0070621 A1 | 4/2003 | Dalh et al. |
| 2005/0217601 A1 | 10/2005 | Judge |
| 2007/0193597 A1 | 8/2007 | Hurwitz |
| 2008/0041416 A1 | 2/2008 | Mathews et al. |
| 2009/0151648 A1 | 6/2009 | Raber |
| 2009/0308951 A1 | 12/2009 | Suter |
| 2012/0222695 A1 | 9/2012 | Suter |
| 2012/0282190 A1 | 11/2012 | Hammer |
| 2013/0291903 A1 | 11/2013 | Tumale |
| 2013/0292497 A1 | 11/2013 | Allen |
| 2014/0209113 A1 | 7/2014 | Turcott |
| 2015/0208605 A1 | 7/2015 | Dole et al. |
| 2015/0296738 A1 | 10/2015 | Dole et al. |
| 2017/0049076 A1 | 2/2017 | Takla |

OTHER PUBLICATIONS

Written Opinion issued in corresponding Application No. PCT/US2017/046923, dated Jan. 12, 2018 (5 pages).
Atomization Concept and Theory; Graco, Inc.; Form No. 321-027 Aug. 1995, Rev 2 SL Training Nov. 2014 (18 pages).
Extended European Search Report issued in corresponding European Application No. 19152010.5, dated Jun. 17, 2019.

\* cited by examiner

SYSTEM AND METHOD FOR MAINTAINING THE HYGIENE OF AN ANIMAL

CROSS-REFERENCE TO RELATED APPLICATIONS

The present application is a continuation-in-part of U.S. patent application Ser. No. 15/242,998 filed Aug. 22, 2016. Accordingly, this application claims benefit of U.S. patent application Ser. No. 15/242,998 under 35 U.S.C. § 120. U.S. patent application Ser. No. 15/242,998 is hereby incorporated by reference in its entirety. U.S. patent application Ser. No. 15/242,998 claims priority from U.S. Provisional Application 62/208,693, which is also hereby incorporated by reference in its entirety. Additionally, the present application claims priority from U.S. Provisional Application 62/448,444, filed on Jan. 20, 2017, which is also hereby incorporated by reference in its entirety.

FIELD OF THE DISCLOSURE

Embodiments disclosed herein relate to a system, apparatus, and method for grooming animals. More particularly, embodiments disclosed herein relate to a system that uses a cleaning device particularly suited for washing an animal by applying a cleaning product to a surface of an animal, and also brushing, and drying an animal using the cleaning device.

BACKGROUND

Household pets, such as, for example, dogs and cats, are often considered to be important members of homes and families. Pets are regularly included in family activities and reside with the family on a permanent basis. Additionally, household pets are often given access to many areas of a house, including bedrooms, and are frequently transported and travel in an owner's vehicle.

Washing and grooming an animal, such as a household pet or other animal (e.g., horse, rabbit, pig, etc.), may be necessary to maintain the hygiene of an animal and to reduce unpleasant odors. Dogs, especially, are associated with unpleasant odors for a variety of reasons, including, but not limited to, the fact that their skin does not have sweat glands and does not allow them to sweat, thus trapping many unwanted odors on their bodies. Additionally, dogs may frequently run and play in mud or dirt, which then sticks to the hair or skin on their bodies.

While it is possible to take one's pet to be professionally cleaned and/or groomed at a pet salon or similar location, such establishments may be costly and/or do not address the need to be able to groom and wash an animal as soon as the animal becomes dirty. Instead, typically, a pet owner becomes obligated to wash an animal by spraying or pouring large amounts of water and soap over the animal, and either drying the animal off with towels or permitting the animal to air dry on its own.

SUMMARY

In general, in one aspect, the invention relates to an animal cleaning device for grooming an animal. In one or more embodiments of the invention, the animal cleaning device includes a top portion that includes a plurality of actuators and a bottom portion affixed to the top portion. In one or more embodiments of the invention, the bottom portion includes a suction vent, a blow vent, a heated airflow vent, a rotating brush, and a formulation dispenser.

Other aspects of the invention will be apparent from the following description and the appended claims.

DETAILED DESCRIPTION

Figure 1:
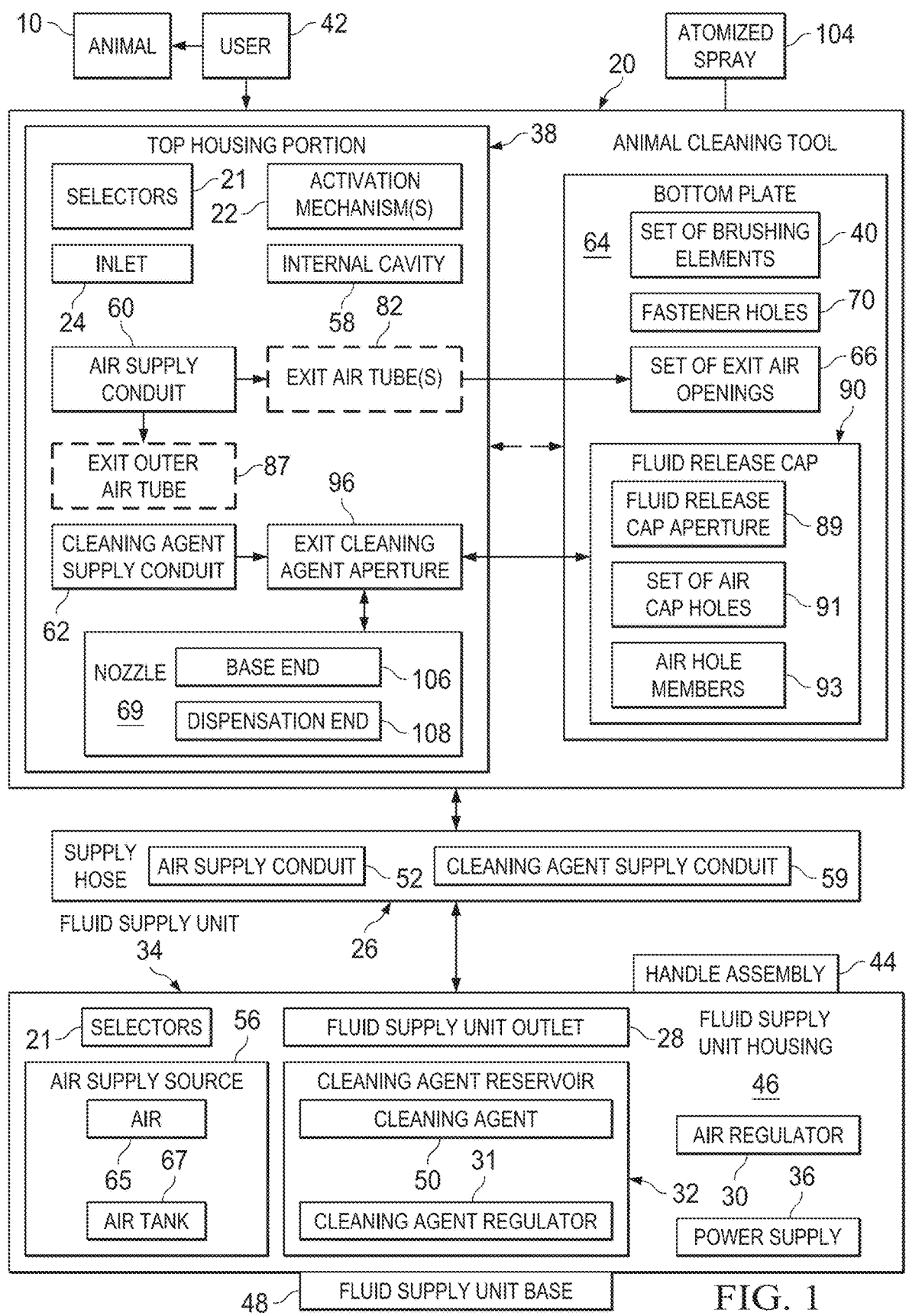
FIG. 1 shows a block diagram of an animal cleaning tool and a fluid supply a unit having an air supply source, and a cleaning agent supply source in accordance with one or more embodiment of the present disclosure.

Specific embodiments will now be described with reference to the accompanying figures. In the following description, numerous details are set forth as examples of the invention. It will be understood by those skilled in the art, and having the benefit of this Detailed Description, that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the present disclosure will be described below with reference to the figures. In one aspect, embodiments disclosed herein relate to one or more apparatuses, systems, and methods for maintaining the hygiene of an animal.

Conventional methods and devices available for cleaning household pets or other animals may be frustrating. The process of washing and/or maintain the hygiene of an animal, including common household pets such as dogs and/or cats, is widely considered to be a chore for animal owners or animal care professionals responsible for cleaning an animal.

Pets may have oily coats that prevent them from being bathed with water regularly. In addition, pets and/or other animals may not enjoy the process of being bathed because of the extensive amount of water, soap, and manhandling involved in positioning the animal for proper bathing and cleaning purposes. Further, it may take an extensive amount of time to bathe and clean an animal. In addition, the time required to clean and bathe an animal may be long and very time-consuming. Typically, the time required to clean and bathe an animal may take at least twenty minutes, and is often longer when taking into account the preparation required to gather all the cleaning materials (e.g., water, towels, buckets, brushes, and soap/shampoo). Keeping an animal (e.g., a pet) still for a long period of a time is challenging.

Further, animals are usually wet and/or dirty prior to being cleaned and often leave a mess inside the house and/or furniture of a bathroom, laundry room, kitchen, or any other area where a pet may commonly be cleaned. Alternatively, the owner must confine the animal to a particular location or area outdoors (e.g., in an outdoor yard or patio) during the cleaning and bathing process. Due to these and other drawbacks of washing and bathing animals, including that the animals do not tend to enjoy the process of being bathed, it is common for pets to be washed infrequently. For example, pet owners may only bathe and thoroughly cleanse their pet either monthly or semi-monthly. Rarely, are pets washed on a daily or weekly basis, because the overall washing process for a pet owner is both labor intensive and messy. As an alternative to bathing and washing one's own animals, pet owners may prefer to take their pet to a pet washing, grooming salon or animal care establishment. However, such establishments are very costly and expensive, and an added drawback is that the pet owner may still be required to transport an unclean animal in a vehicle to the pet salon.

As discussed above, conventional methods for cleaning and washing an animal are often very physically demanding, labor intensive, which is why cleaning and washing an animal is often considered to be an unpleasant task. Further, conventional processes for cleaning a pet may require that a pet owner first apply soap or some type of cleaning product to a surface of the animal. Application of such a cleaning product may be unpleasant, because, for example, often pet owners are applying the soap with their hands, and are required to make physical contact with various parts of an animal, which may be dirty or unappealing to the touch.

Further, conventional methods for bathing and cleaning an animal, as well as any accompanying devices or tools, may use an excessive amount of water during the bathing process. Typically, to wash an animal, including household pets, the animal is submerged into a large container or body of water and/or sprayed with excessive amounts of water. It has been discovered by the present disclosure that it may be counter-effective to effectively cleaning and reducing odors of an animal to deposit an excessive amount of water onto the surface of the animal. Excessive amounts of water that remains on the coat, hair, or fur of an animal may become stagnant and develop unpleasant odors as well as attract more bacteria or other ticks and fleas to the animal, which is may be counter-effective to the washing and bathing process. Thus it may be beneficial to reduce the amount of water in a cleaning product used on an animal in accordance with one or more embodiments of the present disclosure so as to reduce the amount of water that may remain on a surface of an animal and may become stagnant and/or develop unpleasant odors. Additionally, an animal that is cleaned using less fluids (e.g., water), may cause the animal to be less wet, which may cause less of a mess, may make washing in cold weather less uncomfortable for the animal, and may require less time waiting for the animal to dry.

Further, it may become desirable to dry the animal after application of cleaning products and water. However, conventional methods of drying using towels require the owner to engage in personal contact with many parts of the animal, including at least a portion of the moist parts of the animal, and may further require a large number of towels to dry off the animal. Alternatively, an owner may be required to procure a separate drying device, which may pose additional problems for the owner, as well as restricts the locations for washing/drying to occur.

One or more embodiments of the present disclosure may provide a new method of washing and maintaining the hygiene of an animal, including a pet, regularly as well as provide a more effective, soothing cleansing experience for the animal. Further, one or more embodiments of an animal cleaning tool disclosed herein may provide an improved washing and grooming tool that aids an animal owner and/or caretaker to effectively clean and dry an animal in a relatively short amount of time (e.g., on the order of 5-10 minutes in some cases). Further, one or more embodiments of the animal cleaning tool disclosed herein may minimize the use of water applied to a surface or coat of an animal while still providing a deep and thorough cleaning of the animal. By minimizing the amount of water applied to the surface of the animal, there may be a great reduction or substantial elimination of any unwanted odors associated with the animal after being bathed and washed. Some of the additional benefits and advantages of one or more embodiments of the present disclosure are further discussed below.

Reference will now be made in detail to one or more embodiments discussed above, examples of which are illustrated in the accompanying drawings. Throughout the drawings, like reference characters are used to designate like elements. As used herein, the term "coupled" or "coupling" may indicate a connection. The connection may be a direct or an indirection connection between one or more items. Further, the term "set" as used herein may denote one or more of any item.

Figure 2:
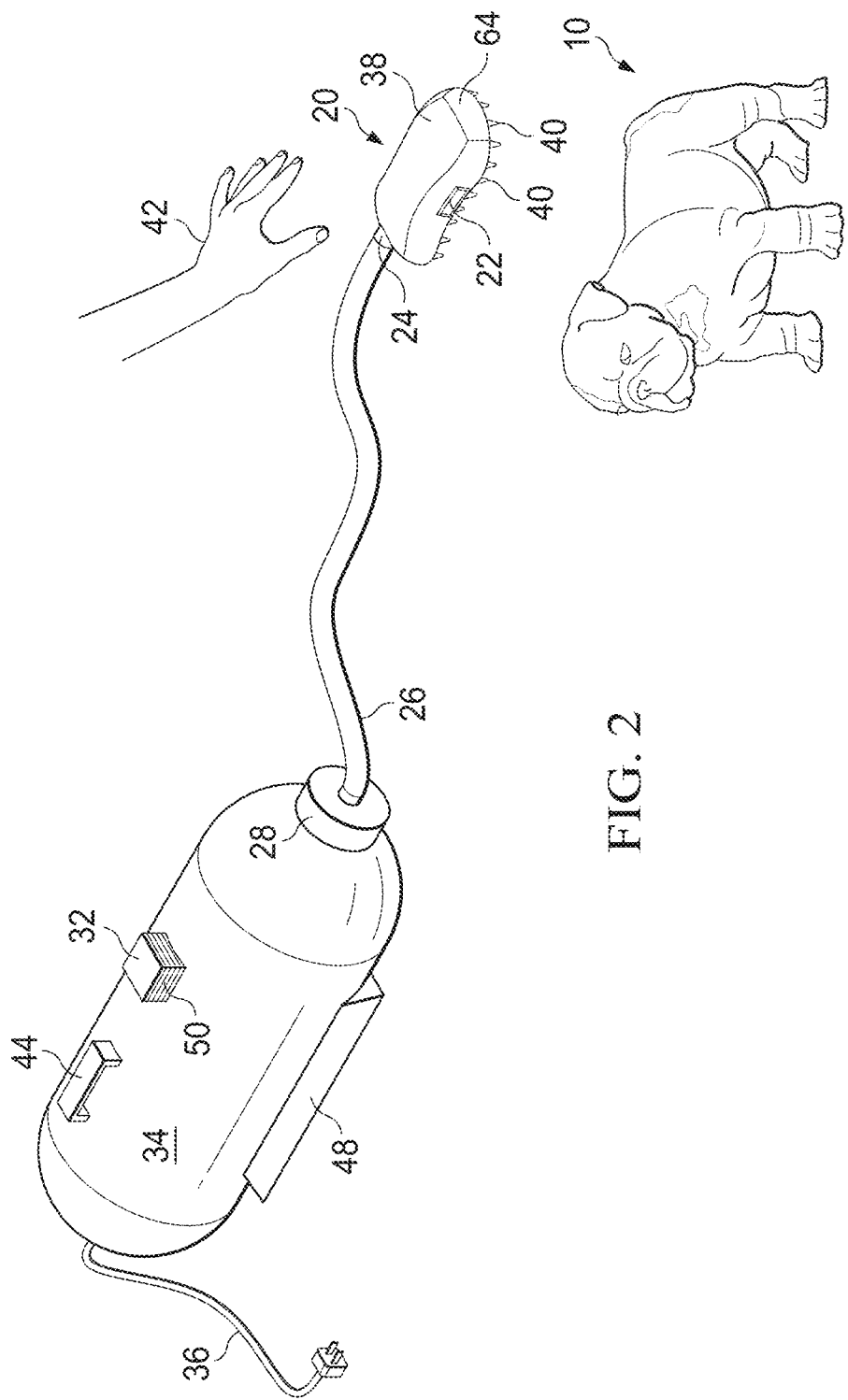
FIG. 2 shows a pictorial illustration of an animal cleaning tool and a fluid supply unit in accordance with one or more embodiments of the present disclosure.

Turning to FIG. 1 and FIG. 2, FIG. 1 shows a block diagram of an animal cleaning tool and a fluid supply unit having an air supply source and a cleaning agent supply source in accordance with one or more embodiments of the present disclosure. FIG. 2 shows an exemplary pictorial illustration of one or more components in the block diagram shown in FIG. 1. It is noted that FIG. 3-12 may further include one or more exemplary components shown in the block diagram of FIG. 1 and described below.

In one or more embodiments, cleaning tool 20, as shown in FIG. 1, may be a tool or device that is adapted to wash, brush, and dry an animal, such as animal 10. Cleaning tool 20 may be interchangeably referred to in the present description as an "animal cleaning tool" or "animal cleaning device". In one or more embodiments, an animal cleaning tool, such as animal cleaning tool 20 includes a top housing portion, such as top housing portion 38, as well as a bottom plate, such as bottom plate 64 in FIG. 1 and FIG. 2. Further, animal 10 may be any type of animal without limitation. In one or more embodiments, animal 10 may be any type of household pet, including commonly known household pets, such as dogs and cats. Furthermore, those of ordinary skill in the art will appreciate that in one or more embodiments cleaning tool 20 may also be used to cleanse and maintain the hygiene of humans in addition to pets and to other non-domesticated animals and farm animals (e.g., rabbits, horses, etc.).

In one or more embodiments, user 42 may include, without limitation, an animal owner and/or animal caretaker. In one or more embodiments, user 42 may include one or more individuals who may be professionally employed to care for and/or attend to animal 10, such as animal cleaners, washers, and staff/employees at veterinarian offices or other animal clinics and facilities. Animal cleaning tool 20 may be implemented in any indoor or outdoor location, including without limitation residences, businesses, salons or other washing facilities, hotels, parks, and camp sites.

In one or more embodiments, cleaning tool 20 may have a top housing portion 38. In one or more embodiments, top housing portion 38 may be a substantially elongated body, such as, for exemplary purposes only, top housing portion 38 as shown in FIG. 2 and FIGS. 4-10. In one or more embodiments, cleaning tool 20 may be substantially oval-shaped or rectangular shaped, which are non-limiting, illustrative examples of shapes that cleaning tool 20 may take. Those of ordinary skill in the art will appreciate that cleaning tool 20 may be any shape, including circular, oblong, triangular, or a combination of any shape known to those of ordinary skill in the art. Further, top housing portion may be L-shaped in one or more embodiments having a descending handle portion for a user to grasp.

Figure 4:
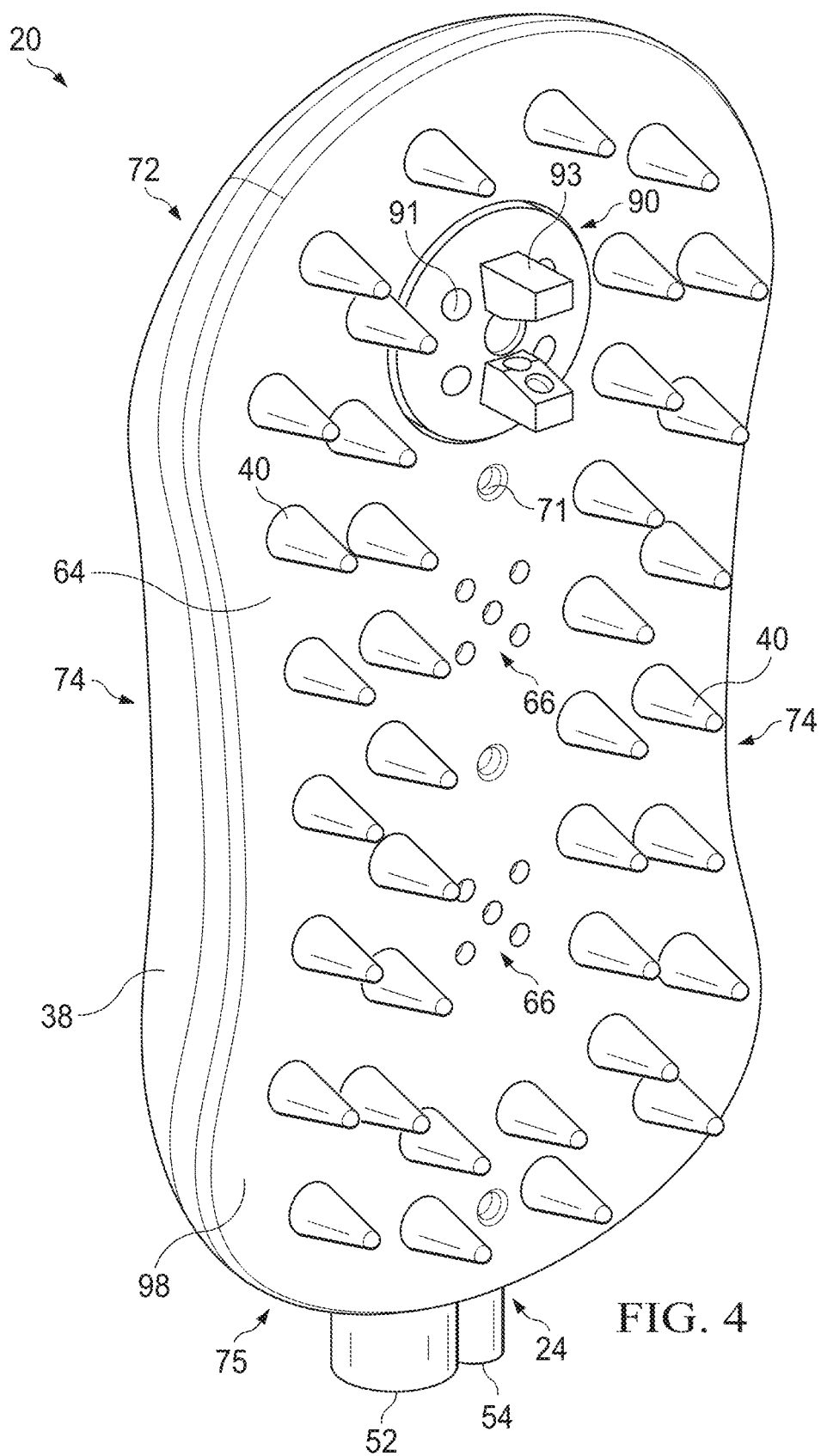
FIG. 4 shows a perspective view of an animal cleaning tool in accordance with one or more embodiments of the present disclosure.
Figure 8:
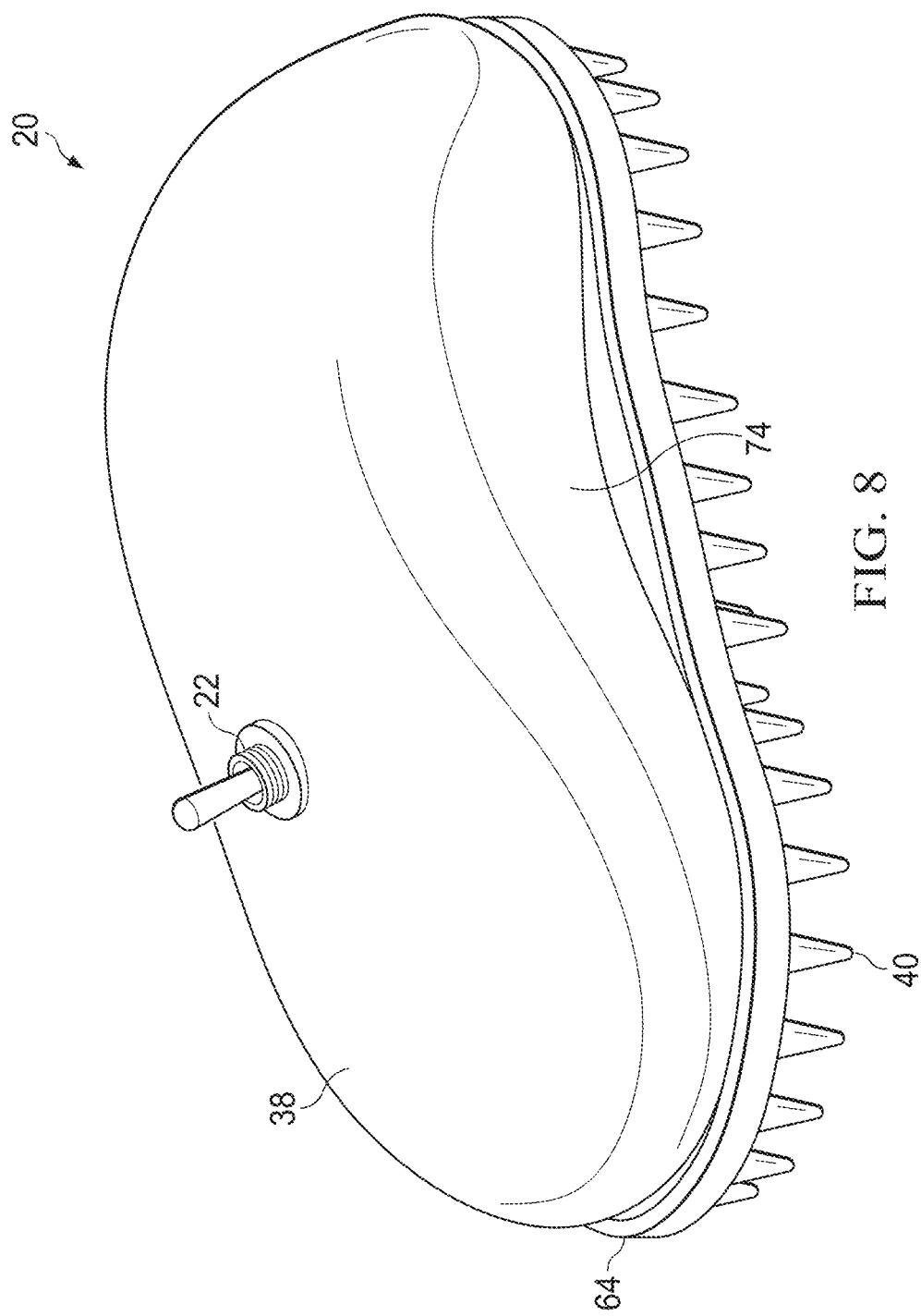
FIG. 8 shows a pictorial illustration of an animal cleaning tool having a top housing portion and a bottom plate in accordance with one or more embodiments of the present disclosure.
Figure 9:
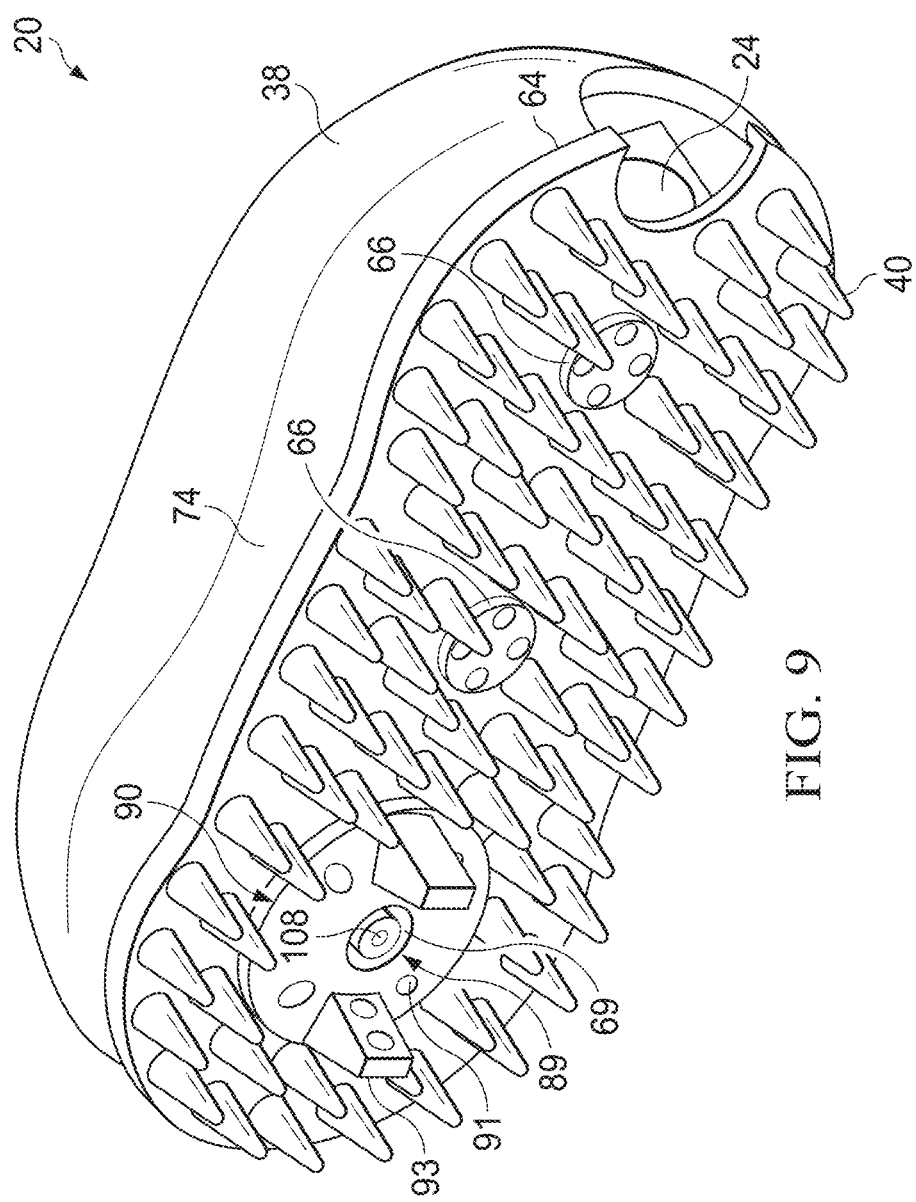
FIG. 9 shows a pictorial illustration from a bottom perspective view of the animal cleaning tool of FIG. 8 in accordance with one or more embodiments of the present disclosure.

In one or more embodiments, top housing portion 38 may include a pair of sidewalls (e.g., pair of sidewalls 74 as shown in FIG. 4 and FIG. 8-9) may curve (e.g. inwardly and/or outwardly) along its sides and towards the center. The pair of sidewalls may thus take on a curved shape similar to a shape of a pointing device (e.g., a mouse) that people use while operating a computer or another electronic device. In one or more embodiments, this curved shape of the sidewalls (e.g., sidewalls 74 in FIG. 4 and FIG. 8-FIG. 9) of top housing portion 38 may advantageously better enable a user, such as user 42 to grasp a top surface and a side surface of cleaning tool 20. Further, in one or more embodiments, the curved shape may help ensure that user 42 is not injured or pained while using animal cleaning tool 20.

In one or more embodiments, a top surface (e.g., top surface 72 in FIG. 4) of animal cleaning tool 20 may be held in the palm of a user's 42 hand and may be used to wash, cleanse, and brush an outer surface of animal 10. In one or more embodiments, cleaning tool 20, including top housing portion 38 and bottom plate 64, may be portable and transportable from one location to another. Further, in one or more embodiments, cleaning tool 20 may be compact so as to fit a hand of a user, such as user 42. In one or more embodiments, cleaning tool 20 may be relatively lightweight. According to embodiments of the present disclosure, cleaning tool 20 may be specially adapted to be maneuvered over a body of animal 10. Animal cleaning tool 20 may be made of any material known in the art, including any combination of materials, and may include rigid portions composed of any material. Further, animal cleaning tool 20 may include elastic, flexible portions composed of elastic materials known in the art (e.g., portions of animal cleaning tool 20 may be made of an elastic plastic or rubber).

In one or more embodiments, cleaning tool 20 may be coupled to a fluid supply unit, such as fluid supply unit 34. In one or more embodiments, fluid supply unit 34 may include an air supply source, such as air supply source 56, as well as a cleaning agent reservoir 32 that stores or retains cleaning agent 50, which is further discussed below. In addition, a supply hose, such as supply hose 26, may be coupled at one of its ends to fluid supply unit 34 and also connected at its other end to an inlet (e.g., inlet 24) of animal cleaning tool 20. In one or more embodiments, supply hose 26 may be substantially tubular hose that is adapted to transfer air, such as air 65, and cleaning agent, such as cleaning agent 50, from fluid supply unit 34 to animal cleaning tool 20.

Supply hose 26 may be any length without limitation herein. Those of ordinary skill in the art, and having the benefit of this Detailed Description, will appreciate that supply hose 26 may be formed from any material known in the art. In one or more embodiments, supply hose 26 may be composed of a material having characteristics such as being flexible or elastic, and may be configured to extend over a range of distance, which may advantageously provide a user with greater range of movement and/or maneuverability when using cleaning tool 20. Supply hose 26 may be transparent or opaque in appearance, and may be of any color or shape as desired.

Supply house 26 may include one or more connectors and/or adapters on either end. In one or more embodiments, connectors or adaptors disposed on either end of supply hose 26 adapt to and connect to designated connection points on either animal cleaning tool 20 (including either top housing portion 38 or bottom plate 64) or fluid supply unit 34.

As discussed above, in one or more embodiments, fluid supply unit 34 may be configured to include and/or operate as an air supply source. In one or more embodiments, fluid supply unit 34 may include or may be configured as an air supply source, such as air supply source 56. In one or more embodiments, air 65 may be supplied by fluid supply unit 34 to animal cleaning tool 20 (e.g., via supply house 26). As is further discussed below, air 65 may be supplied to animal cleaning tool 20 so that air 65 is flowed to animal cleaning tool 20 and directed or emitted from a designated location on an animal cleaning tool (e.g., bottom plate 64 and/or set of exit air openings 66 as shown in FIG. 4 and FIG. 9) onto the hair or skin of animal 10. Accordingly, fluid supply unit 34 may be configured to supply air (e.g., air 65) to animal cleaning tool 20.

Air 65 supplied by fluid supply unit 34 may be utilized in a number of applications, including without limitation, to dry off animal 10 such as when animal 10 may be wet. Further, air 65 supplied by fluid supply unit 34 (e.g., via air supply source 56) may be used to blow air 65 onto a surface of an animal 10 in order to remove excess or unwanted particles from a surface of animal 10, such as without limitation, water, dirt, hair or fur (in order to de-shed animal 10), and even excess cleaning agent (e.g., cleaning agent 50). Further, air 65 may also be blown onto animal 10 using animal cleaning tool 20 to assist in blowing off and/or removing ticks or fleas that may be located on animal 10. In addition to the above, another exemplary application of air 65 may be to provide cool air or hot air on a surface of animal 10 whereby air 65 may be cooled or heated when emitted from animal cleaning tool 20. Furthermore, as further discussed below, in one or more embodiments, air 65 may be directed to animal cleaning tool 20 and used to produce an atomized spray 104, whereby cleaning agent 50 is distributed onto a surface of an animal 10 as a spray of fine or small particles.

Fluid supply unit 34 may include, in one or more embodiments, an air supply source that may produce air at any psi (pound per square inch) that is suitable or desired. In one or more embodiments, a pressure gauge may be located on fluid supply unit 34 that indicates the pressure at which air 65 is being released from fluid supply unit 34, and air 65 may be emitted at a range from low to high pressure as needed.

Furthermore, fluid supply unit 34 may include a number of electromechanical components for circulating and directing air from fluid supply unit 34 to animal cleaning tool 20, and further include wiring to provide an electrical connection between one or more components of fluid supply unit 34. In one or more embodiments, fluid supply unit 34 may include or be configured as, without limitation, an air blower, a fan, an air compressor, a vacuum, or may include any combination thereof, any or all of which may be powered using one or more electric motors (e.g., a speed-controlled motor), which are discussed in greater detail below. Fluid supply unit 34 may be configured of any size and any suitable dimensions, and may be configured to hold any volume of air. In one or more embodiment, the fluid supply unit 34 may include a tank for storing air, for example purposes only, fluid supply unit 34 may include a 1.5 gallon tank for storing air. Those of ordinary skill in the art will appreciate that larger or smaller sized tanks may be included in fluid supply unit 34.

In one or more embodiments of the invention, fans and blowers are electromechanical devices that may be used to circulate air. In general, an air blower may be known as an electromechanical device that circulates and channels air to a specific area or location, while a fan circulates airflow to an overall, more generalized area. Fluid supply unit 34 may include one or more air blowers that may be configured as centrifugal blowers or positive displacement blowers in one or more embodiments. Other types of air blowers may be utilized without limitation in the assembly or configuration of fluid supply unit 34.

In one or more embodiments, fluid supply unit 34 may include one or more fans to direct air. A fan may be a machine that is used to create flow within a fluid, such as air. A fan, such as a fan included in fluid supply unit 34 in one or more embodiments, may include vanes or blades that rotate and act on air, and include one or more impellers or rotors. Impellers included in fluid supply unit 34 may help in directing the air flow, and producing air at low pressure.

In one or more embodiments of the invention, a fan that is included in fluid supply unit 34 may be powered by one or more electric motors. As an example, the electric motor may be a speed-controlled motor. As used herein, in one or more embodiments of the invention, a speed-controlled motor is an electric motor whose speed of rotation (i.e., motor speed) may be controlled. In one or more embodiments of the invention, the rotation of a speed-controlled motor is controlled by dividing a single rotation of the motor into any number of discrete steps, each being a portion of a full rotation. In other embodiments of the invention, the rotation of a speed-controlled motor may be controlled by controlling the level of electrical power provided to the motor. Any other method of controlling motor rotation speed may be used without departing from the scope of the invention. For example, a motor control unit may be used to control the speed of the motor. In one or more embodiments of the invention, controlling the rotation speed of the speed-controlled motor may allow the motor to start at a relatively slow speed, which may correspond to a relatively reduced volume, and be progressively increased at any rate while the motor is being operated. Such volume control may cause an animal to be less frightened of the device and allow the animal to gradually become accustomed to increasing levels of motor noise. Alternatively, other types of motors may be used as known in the art, including without limitation hydraulic motors.

Further, a fan that is included in fluid supply unit 34 as an air supply source may be, without limitation, an axial flow fan, a centrifugal fan, or a cross flow fan. Fluid supply unit 34 may include an air supply source having a variety of sizes, energy efficiency, and airflow.

In one or more embodiments, fluid supply unit 34 may include an air tank 67 for storing air 65. Air 65 may be directed in through one or more inlet points, such as, without limitation, one or more intake vents and/or filters. Further, in one or more embodiments, fluid supply unit 34 may include or be configured as an air compressor to supply pressurized air 65 to animal cleaning tool 20. In one or more embodiments of the invention, an air compressor may be a machine that compresses air. Further, an air compressor may incorporate or utilize one or more fans and/or blowers. An air compressor may take air into an intake port on a compressor pump, and, using mechanical means (e.g., pistons, screws, rotary sliding vanes), pushes the air into a smaller area. As additional air is pushed into the smaller area (e.g. air tank 67 located in fluid supply unit 34) the pressure may continue to increase inside the air tank 67 until a maximum air pressure is reached. The air compressor may be configured to take in air and compress the air as needed when a level of air within the air tank 67 has dropped to a minimum level upon use.

In one or more embodiments, fluid supply unit 34 may be configured to include or to operate as an air compressor that intakes air, compresses the air, and stores the compressed air in an air tank (e.g., air tank 67) located within the fluid supply unit 34. When the fluid supply unit 34 is activated, the compressed air may be directed to one or more conduits that supply the compressed air to the animal cleaning tool (e.g., air supply conduit 52 in supply hose 26).

Air 65 may be stored as compressed air or as uncompressed air. The air tank located in fluid supply unit 34 may be of any size to hold any volume of air. In one or more embodiments, fluid supply unit 34 may include an air tank that holds at least 20 gallons of air.

Further, fluid supply unit 34 may include a power supply 36 to provide power to one or more motors (e.g., a speed-controlled motor as described above) included within fluid supply unit 34. Fluid supply unit 34 may be powered by electrical energy source such as, for example, that provided from an outlet (e.g., power may be supplied through an electrical power cord as shown in FIG. 2). In other embodiments, fluid supply unit 34 may be powered through any source of power, including without limitation, rechargeable or non-rechargeable batteries included in fluid supply unit 34, gas power, or any other type of fuel. Solar powered energy cells may also be included in one or more embodiments in fluid supply unit 34. Furthermore, in one or more embodiments, fluid supply unit 34 may include an attachment or an outlet that is configured to be plugged into a power outlet of a vehicle, such as an automobile, such that fluid supply unit 34 may be powered by a vehicle battery. Those of ordinary skill in the art, and having the benefit of this Detailed Description, will appreciate that any number of ways may be used to power fluid supply unit 34.

Fluid supply unit 34 may include a housing 46. Fluid unit housing 46 may be an outer structure or enclosure that encloses and protects internal components of fluid supply unit 34. Internal components of fluid supply unit 34 may include any number of electrical and/or non-electrical components, including motors (e.g., speed-controlled motors), impellers, pumps, valves, pipes or conduits, or tanks.

To control airflow originating from fluid supply unit 34, a regulator, such as airflow regulator 30 may be included with fluid supply unit 34. Regulator 30 may be configured to control a pressure associated with the airflow of air 65, including increasing or decreasing a volume of air provided by fluid supply unit 34. Further, in some embodiments, regulator 30 may be configured to control the velocity, the pressure setting, and/or a temperature of the air provided by fluid supply unit 34. Thus, in some embodiments, fluid supply unit 34 may be configured to heat or cool air dispensed or directed to animal cleaning tool 20. For example, in one or more embodiments of the invention, the regulator 30 may include flow control valve that controls a flow of water from a water reservoir for cooling the air, which may be controlled by a user. In one or more embodiments of the invention, the water reservoir may be pressurized to between 1.5 and 2 pounds per square inch, and opening the flow control valve may allow for water to enter and cool a flow of air.

In some embodiments, fluid supply unit 34 may further include a cleaning agent regulator 31 to control the flow of cleaning agent 50 released to supply hose 26 and/or cleaning agent supply conduit 54.

In one or more embodiments, regulator 30 may be any type of selector, including a dial, button, knob, trigger, or another selector known in the art. Regulator 30 may be configured to decrease or increase air flow velocity and/or pressure from fluid supply unit 34. In one or more embodiments, regulator 30 may be disposed anywhere on an outer surface of fluid supply unit housing 46. Alternatively, regulator 30 may be disposed on cleaning tool 20 or more than one regulator may be located on both fluid supply unit 34 and cleaning tool 20.

It is in keeping with the present disclosure that, in one or more embodiments, fluid supply unit 34 may be useful as a portable unit (i.e., may be moveable from one location to another and not fixed to a supporting structure). Accordingly, in one or more embodiments, fluid supply unit 34 may include a base, such as fluid supply unit base 48. Fluid supply unit base 48 may provide a surface or base upon which fluid supply unit 34 may rest when placed over a support surface, including a lower surface such as, on a floor surface, ground surface, furniture surface, or any other type of surface. Advantageously, the portability of fluid supply unit 34 in one or more embodiments enables a user 42 the freedom to move fluid supply unit 34 from place to place to use anywhere that is convenient to user 42. Further, animal owners are not restricted to designated areas at one's house or backyard, but rather may use fluid supply unit 34 to clean an animal directly after the animal may become dirty in any setting, including at a park or play area. In one or more embodiments, wheels may be attached to fluid supply unit base 48 to assist in the movement and maneuverability of fluid supply unit 34.

Accordingly, in one or more embodiments where fluid supply unit 34 is portable, fluid supply unit 34 may include a handle assembly 44, which may provide a convenient means for gripping and moving fluid supply unit 34 from one location to another. In an exemplary embodiment, as shown in FIG. 2, handle assembly 44 may be disposed on a top outer surface of fluid supply unit housing 46. Nevertheless, those of ordinary skill in the art will appreciate that handle assembly 44 may be disposed anywhere on fluid supply unit 34 and fashioned as any type of handle assembly known to those of ordinary skill in the art.

Figure 7:
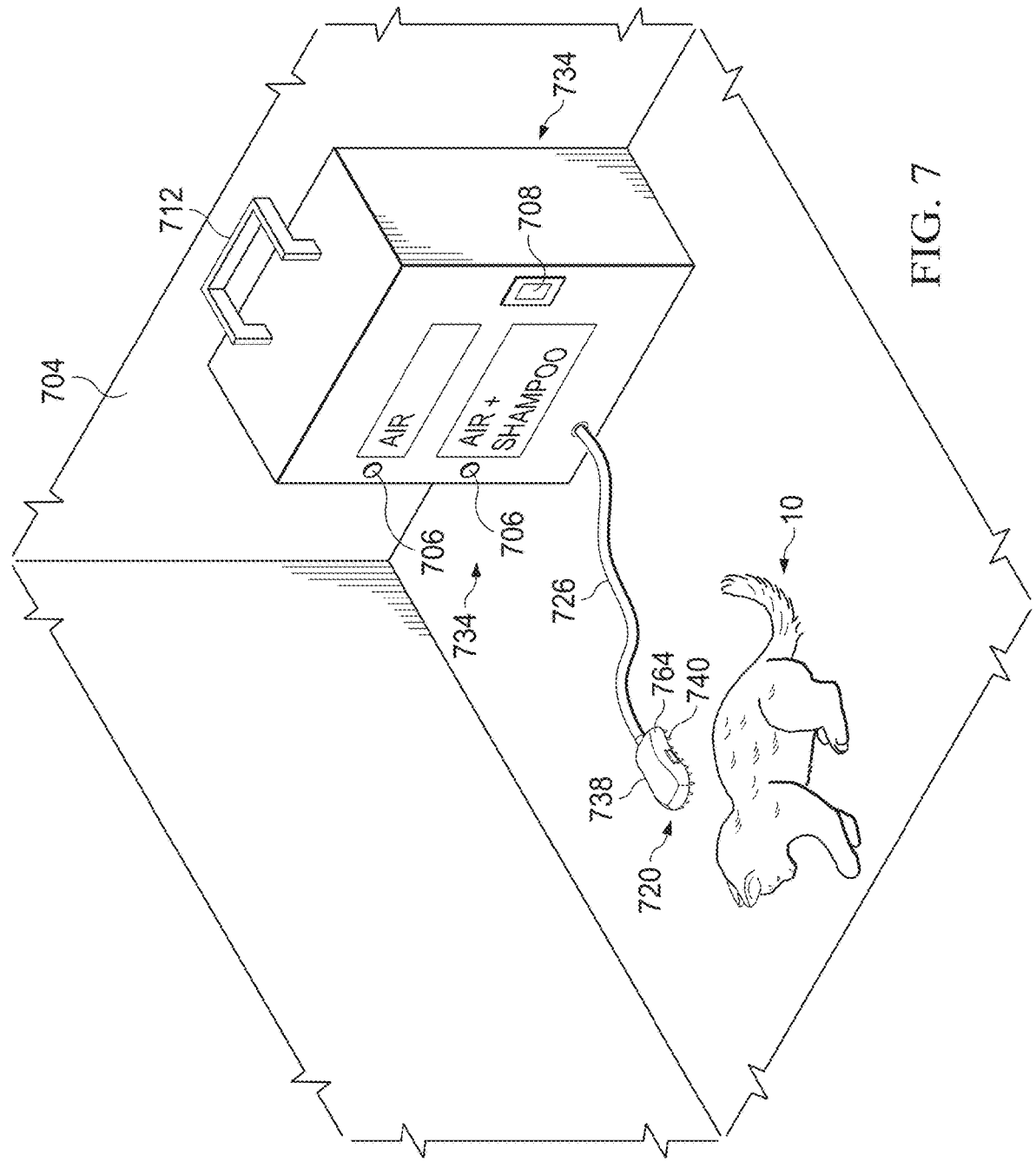
FIG. 7 shows a pictorial illustration of a non-portable fluid supply unit mounted to a support surface in accordance with one or more embodiments of the present disclosure.

In one or more embodiments, fluid supply unit 34 may be non-portable (e.g., as shown in FIG. 7 and described further below). Accordingly, in one or more alternative embodiments, fluid supply unit 34 may be fixed or mounted to any support structure, including any horizontal or vertical structure, such as a pole, column, or wall. Alternatively, in one or more embodiments, fluid supply unit 34 may be fixed to a horizontal support structure, such as the ground or one or more additional horizontal structures, such that fluid supply unit 34 is not portable. Further, in one or more embodiments, if included, fluid supply unit base 48 may be permanently fixed to another surface or structure, including any vertical or horizontally oriented support surface.

Fluid supply unit 34 may be composed of any type of material known in the art. While it may be beneficial for internal components of fluid supply unit 34 to be composed of one or more metals (e.g., stainless steel, aluminum, iron, or any combination thereof or other type of metal), it may be preferable, in some embodiments, for housing 46 of fluid supply unit 34 to be made of plastic and/or polymers, in order for fluid supply unit 34 to be more lightweight. Nevertheless, the material used to form the outer housing and/or internal structure and components of fluid supply unit 34 is not limited to any particular material in the present disclosure. Further, fluid supply unit 34 may be of any shape or size.

In one or more embodiments, fluid supply unit 34 may include cleaning agent reservoir 32. Cleaning agent reservoir 32 may be a receptacle or storage container configured to contain and store cleaning agent 50. In one or more embodiments, cleaning agent reservoir 32 may be a receptacle located or formed within fluid supply unit 34. Alternatively, in one or more embodiments, cleaning agent reservoir 32 may be a receptacle that is coupled to the housing 46 of fluid supply unit 34. In one or more embodiments, cleaning agent reservoir 32 may be removable.

As illustrated in FIG. 2, cleaning agent reservoir 32 may be disposed on an outer surface of fluid supply unit housing 46. In other embodiments, cleaning agent reservoir 32 may be disposed internally within fluid supply unit 34. Cleaning agent 50 may be provided and stored in cleaning agent reservoir 32 for further distribution and dispensation to animal cleaning tool 20. In one or more embodiments, cleaning agent reservoir 32 may include any type of lid, cap, or cover to contain cleaning agent 50 within cleaning agent reservoir 32.

Alternatively, in other embodiments, cleaning agent reservoir such as cleaning agent reservoir 32 may be stored, instead of in the fluid supply unit 34, in a portion of animal cleaning tool 20. For example, in one or more embodiments, cleaning agent reservoir 32 may be located in the top housing portion 38 of animal cleaning tool 20, and may be activated to be dispensed from the top housing portion 38 of animal cleaning tool 20. Thus, in such an embodiment, cleaning agent 32 may be poured or located within a designated storage location in top housing portion 38 of animal cleaning tool 20, and upon activation, cleaning agent 50 may be directed to one or more distribution points of top housing portion 38, including cleaning agent supply conduit 62 and/or nozzle dispensation end 108.

In one or more embodiments, cleaning agent 50 may also be described as a cleaning product including without limitation, a soap, shampoo, detergent, or any other type of cleaner. In one or more embodiments, cleaning agent 50 may be a solution having cleansing properties that may be particularly suited for cleaning the coat, hair, fur, and/or skin of animal 10. The term "solution" as used in the present description may encompass all such terms as "composition," "formulation," "mixtures," "emulsions," and "solutions" and such terms are used interchangeably herein.

In one or more embodiments, cleaning agent 50 may be in liquid form. Alternatively, in other embodiments, cleaning agent 50 may be in non-liquid form, including, for example, a type of powder and/or dry shampoo. In one or more embodiments, cleaning agent 50 may be stored in cleaning agent reservoir 32 and/or released from the animal cleaning tool 20 in any form as known in the art including as an emulsion, a cream, a lotion, a spray, a gel, including without limitation as a foam gel.

According to one or more embodiments, cleaning agent 50 may be a shampoo and may include among its ingredients in its formulation water, detergents, foam boosters, thickeners, conditioning agents, preservatives, modifiers, and/or special additives. In some embodiments, cleaning agent 50 may include deionized water, which is specially treated to remove various particles and ions.

Typically, shampoos are composed of a high percentage of water that tends to range between 70% to 80%. It has been found in the present disclosure that it may be beneficial to minimize the amount of water used when cleaning or bathing an animal, such as animal 10 in order to reduce the drying time needed for the water to dry off a surface of animal 10, as well as to reduce the possibility of the water becoming stagnant and developing unpleasant odors. Accordingly, it has been discovered herein that it may be beneficial to minimize or reduce the percentage of water contained in cleaning agent 50 (e.g., as compared to conventional shampoos). Accordingly, in one or more embodiments of the present disclosure, cleaning agent 50 may contain a reduced amount of water. For example, in one or more embodiments, cleaning agent 50 may contain less than 70% of water in the total composition of cleaning agent 50. In an exemplary system, the percentage of water included in cleaning agent 50 may be determined as a percentage by weight (i.e., weight percentage or weight %).

In one or more embodiments, cleaning agent 50 may contain about 30% of water to about 40% of water. In other embodiments, cleaning agent 50 may contain about 50% of water to about 55% of water. In yet other embodiments, cleaning agent 50 may contain about 55% of water to 65% of water. Notwithstanding the above, in alternative embodiments, any type of cleaning agent may be disposed within cleaning agent reservoir 32, including cleaning agents having a higher percentage of water than 70%.

In addition to the above-mentioned ingredients, in one or more embodiments, cleaning agent 50 may include other additives such as fragrances or scents that emit a pleasant odor. Alternatively, cleaning agent 50 may be fragrance free and odorless so as not to irritate any allergies or sensitivities of animal 10 and/or user 42. Additionally, in one or more embodiments, cleaning agent 50 may include medication for treatment of fleas, skin conditions and irritations, and/or other parasites that may become problematic on an outer surface of a pet or animal, such as animal 10. Further, certain types of cleaning agent 50 may be particularly selected by user 42 to suit a particular type of animal 10.

In one or more embodiments, cleaning agent 50 may be distributed from fluid supply unit 34 and made to flow from fluid supply unit 34 through supply hose 26 and into an inlet 24 of animal cleaning tool 20. In one or more embodiments, fluid supply unit 34 may include any number of pumps and/or tubes for moving cleaning agent 50 from cleaning agent reservoir 32 to supply hose 26.

According to embodiments of the present disclosure, supply hose 26 may be removeably coupled to an outlet of fluid supply unit 34 (e.g., outlet 28 as shown in FIG. 2) at an outer opening located at one end of supply hose 26. Further, supply hose 26 may also be removeably coupled to an inlet of cleaning tool 20 (e.g. inlet 24 shown in FIG. 2) at another end of supply hose 26. In one or more embodiments, inlet 24 of cleaning tool 20 may be an opening defining a hole or cavity that provides entry or access into an internal cavity 58 of cleaning tool 20, and in particular, an internal cavity 58 of top housing portion 38. It may be useful for supply hose 26 to be removable for purposes of cleaning out an interior of supply hose 26 or to perform maintenance and repair on one or more components of supply hose 26.

In one or more embodiments, supply hose 26 may be threadably coupled at each of its ends to an outlet of fluid supply unit 34 and to an inlet 24 of cleaning tool 20. Those of ordinary skill in the art will appreciate that in other embodiments, supply hose 26 may be coupled using any means known in the art, including through any type of fasteners (e.g., screws, clips, pins), adhesives, welding, or other coupling methods and tools. In one or more embodiments, both ends of supply hose 26 may snap onto respective receiving portions of fluid supply unit 34 and cleaning tool 20. Further, in one or more embodiments, supply hose 26 may be affixed through more permanent means to an outlet of fluid supply unit 34.

In one or more embodiments, supply hose 26 may be configured to enclose at least two conduits or pipes, such as air supply conduit 52 and cleaning agent supply conduit 59. Accordingly, in some embodiments, supply hose 26 may act as an outer housing that encloses one or more conduits that pass through an internal cavity of supply hose 26. Thus, supply hose 26 may include at least two conduits (e.g., 52 and 59) in some embodiments. Those of ordinary skill in the art will appreciate that more or less conduits may be disposed within hose 26 in alternative embodiments as needed.

In one or more embodiments, a first conduit, such as air supply conduit 52 may be used to channel and move air 65 provided from an air supply source in fluid supply unit 34 to animal cleaning tool 20. Further, in one or more embodiments, a second conduit, such as cleaning agent supply conduit 59 may be used to channel cleaning agent 50 from a cleaning agent reservoir, such as cleaning agent reservoir 32 to animal cleaning tool 20. Thus, in one or more embodiments, air 65 provided by an air supply source in fluid supply unit 34 (e.g., air supply source 56) may be in fluid communication with air supply conduit 52 and cleaning agent 50 may be in fluid communication with cleaning agent supply conduit 59.

It may be beneficial for supply hose 26 to enclose conduits 52 and 59 so that the user 42 is not manipulating multiple conduits while also maneuvering cleaning tool 20 over a body of animal 10. Rather, in one or more embodiments, supply hose 26 may enclose conduits 52 and 59 for increased ease of movement. An added benefit may be that supply hose 26 may protect the exterior surfaces of conduits 52 and 59 from any damage that may occur due to prolonged contact during use with one or more rough surfaces (e.g., such as a ground surface) and possible dragging against such surfaces.

Alternatively, supply hose 26 may be formed as a dual conduit hose, having one side or conduit of the dual conduit hose dedicated to channeling cleaning agent 50 to cleaning tool 20 and the other side of the dual conduit hose dedicated to channeling air 65 from fluid supply unit 34 to animal cleaning tool 20.

Figure 5:
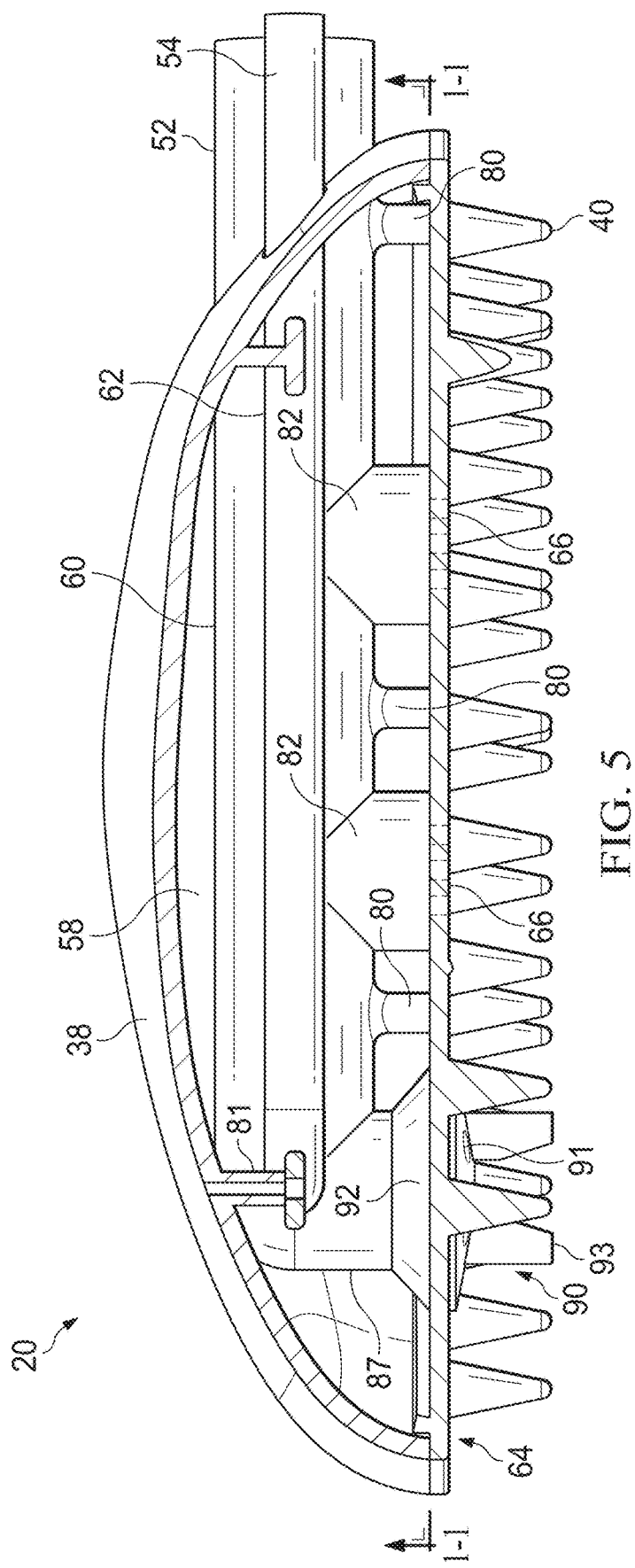
FIG. 5 shows a cut-away view of into an interior cavity of an animal cleaning tool in accordance with one or more embodiments of the present disclosure.

As discussed above, in one or more embodiments, animal cleaning tool 20 includes a top housing portion 38 that may be particularly adapted to being held in a palm of a user's 42 hands. In some embodiments, cleaning tool 20 may further include an internal cavity 58. In one or more embodiments, at least two conduits may be disposed within internal cavity 58. For example, air supply conduit 60 and cleaning agent conduit 62 may be located within internal cavity 58 of cleaning tool 20 (e.g. as shown in FIG. 4 and FIG. 5). Thus, air supply conduit 60 of cleaning tool 20 may be in fluid communication with air supply conduit 52 as located within or formed as a conduit of supply hose 26. Further, cleaning agent conduit 62 may be in fluid communication with cleaning agent conduit 59 as located either within, or, in some embodiments, formed as a secondary conduit of supply hose 26.

In one or more embodiments, cleaning tool 20 may include a bottom plate 64. FIG. 4 and FIG. 8 show non-limiting, pictorial illustrations of bottom plate 64. In one embodiment, bottom plate 64 may be removeably attached to a bottom surface of cleaning tool 20. Thus, when bottom plate 64 is coupled to a bottom surface of a top housing portion 38 of cleaning tool 20, the internal cavity 58 of the top housing portion 38 may not be visible to user 42 (e.g., as shown in FIG. 4).

It may be beneficial to have bottom plate 64 be removeably coupled to a bottom surface of cleaning tool 20, so as to be able to clean the interior o of cleaning tool 20 as well as to conduct any repairs or maintenance needed. Accordingly, bottom plate 64 may be affixed to a bottom surface of top housing portion 38 using any type of affixation means. In one or more embodiments, any fasteners known in the art may be used to affix bottom plate 64, including without limitation, screws, pins, clips, and other useful fasteners. Such fasteners (e.g., fasteners 71 shown in FIG. 4) may be engaged or located in one or more fastener holes 70 located on an outer and/or inner surface of bottom plate 64 and used to removeably couple bottom plate 64 to a bottom surface of top housing portion 38.

In other embodiments, bottom plate 64 may be permanently affixed to a top housing portion 38 of animal cleaning tool 20 so as not to be removable. In such embodiments, cleaning tool 20 may be integrally formed as a whole body having an internal cavity with one or more conduits for cleaning agent 50 and air 65 to be directed to, such as air supply conduit 60 and cleaning agent supply conduit 62. Alternatively, bottom plate 64 may be adapted to snap onto and engage with a bottom surface of top housing portion 38. Thus, bottom plate 64 may be snapped on and snapped off.

In one or more embodiments, bottom plate 64 may include a set of brushing elements 40 and a set of exit air openings 66. FIG. 4 and FIG. 8 may provide more detailed (non-limiting) views of an embodiment of bottom plate 64 for further clarification. It is noted that the term "set" as used herein may refer to one or more items. Thus, a "set" may refer to a singular item or to more than one item.

In one or more embodiments, a set of brushing elements 40 may protrude from an outer surface of bottom plate 64. The term "brushing elements" as used in the present description may be interchangeably referred to as bristles, such as those that may be located on an outer surface of a brush and may be used to engage with hair, fur, and the like. As known in the art, bristles may come in many forms. Bristles may be formed as short, stiff hairs that protrude from a brushing surface. In other embodiments, bristles may be formed of metal, plastic, rubber, or any type of material known in the art. In one or more embodiments, set of brushing elements 40 may be formed as conical elements that protrude from a brushing surface of a brush. In other embodiments, set of brushing elements 40 may be spherical or circular shaped protrusions that extend from an outer surface of bottom plate 64. As stated above, there is no limitation as to the form, shape, size, material, or type of brushing elements 40 that may be disposed on and protrude from an outer surface of bottom plate 64. A set of brushing elements 40 may be any shape, including circular, triangular, rectangular, or any other shape suitable to their application. Further, in one or more embodiments, bottom plate 64 may be configured to rotate. Alternatively, a separate rotational brush attachment (not shown) may be coupled to bottom plate 64 in one or more embodiments. Further, set of brushing elements 40 may be arranged to protrude outwardly from a bottom surface of cleaning tool 20 in any pattern or order, and may be adapted for brushing the outer surface of animal 10. Further, a set of brushing elements 40 may be formed as having the same or varying lengths.

Depending on what type of animal (i.e., its genus and/or species), animal 10 may have hair or fur located above its outer layers of skin. The outer surface of hair or fur of animal 10 may also be referred to as a "coat." According to one or more embodiments, set of brushing elements 40 may be used to brush the coat of animal 10, including brushing cleaning agent 50 into the coat of animal 10 in order to clean and maintain the hygiene of animal 10, according to one or more methods of the present disclosure. Subsequent to being used to brush animal 10, in one or more embodiments, any hair or fur from animal 10 that may become lodged between the set of brushing elements 40 may be pulled out and removed so as to keep the set of brushing elements 40 free of any accumulated hair, fur, or debris.

The set of brushing elements 40 may be configured for making direct contact and engage with an outer surface of animal 10. Advantageously, the set of brushing elements 40 may make contact with an outer surface of animal 10 so that user 42 may avoid physically touching and/or engaging in extensive physical contact with the animal 10, especially when animal 10 may be dirty, wet, or in any other condition.

In one or more embodiments, bottom plate 64 may include a set of exit air openings 66. In one or more embodiments, a set of exit air openings 66 may be a set of apertures or openings from which air 65 may be ejected or emitted. A non-limiting, illustrative embodiment of a set of exit air openings 66 is shown in FIG. 4 and FIG. 8-9. A set of exit air openings 66 may be distributed as a set of smaller holes closely spaced together or as a set of holes that are spaced farther apart. FIG. 4 shows an exemplary, non-limiting, illustrative embodiment, whereby a set of exit air openings 66 are arranged as a first group of five openings closely spaced together that are axially aligned with a second group located beneath the first group, whereby the second group also include five holes or openings that are arranged closely spaced together. FIG. 9 shows another non-limiting, illustrative embodiment whereby set of exit air openings 66 may be arranged as a set of four holes closely spaced together. Those of ordinary skill in the art will appreciate that set of exit air openings 66 may be distributed in any pattern or arrangement on an outer surface of bottom plate 64. Set of exit air openings 66 may be formed of any diameter and/or size. Further, any number of exit air openings may be arranged on an outer surface of bottom plate 64 and configured for releasing air 65.

Those of ordinary skill in the art will appreciate that in some embodiments, there may be a single exit air opening 66 disposed on a bottom plate 64 that is configured for air 65 to flow through and be ejected therefrom. For example, in some embodiments, there may be a single exit air opening 66 having any diameter and/or size, and may be located anywhere on bottom plate 64 to allow air 65 to flow through.

As discovered herein, in one or more embodiments, it may be beneficial for cleaning agent 50 to be dispensed in atomized form as an atomized spray 104 onto animal 10. As used herein, atomization refers to the process of providing cleaning agent 10 as a fine spray of particles or droplets. The terms "particles" or "droplets" may be interchangeably used herein. Atomization refers to the process of breaking up bulk liquids into droplets. Atomized spray 104 may also be described as a collection of droplets.

As previously discussed, most conventional cleaning methods and techniques tend to involve pouring or releasing an excessive amount of soap, shampoo, and/or water onto a surface of an animal, such as animal 10. It has been discovered herein that by atomizing cleaning agent 50 into a fine spray of droplets that the cleansing process becomes more efficient and saves the animal owner a great deal of time as well as reducing the amount of excessive soap and water released onto a surface of animal 10. Animal cleaning tool 20 is configured to thoroughly and effectively brush the atomized spray 104 of particles into a surface of the animal 10, whereby atomized spray 104 provides the cleansing properties of cleaning agent 50 without requiring excessive time and effort to rinse out an overabundance of cleaning agent 50 and/or water. Further, the experience of being cleaned and bathed may be more pleasant for animal 10 as compared to conventional tools and cleansing methods, because the animal 10 is not being soaked with large quantities of water and cleaning agent.

In one or more embodiments, animal cleaning 20 is configured to atomize cleaning agent 50 using air spray atomization. Air spray or air atomization is a process by which fluid (e.g., cleaning agent 50) may emerge or be ejected from a nozzle disposed in animal cleaning tool 20 (e.g., nozzle 69) at a relatively low speed and is surrounded by a high speed stream of air (e.g., air 65). The relatively high speed stream of air (e.g., air 65) may be provided by an air compressor or air blower as located in fluid supply unit 34. Air atomization utilizes air pressure, which may be regulated using one or more regulators (e.g., air flow regulator 30). Further, user 42 may regulate the flow rate of cleaning agent 50 independently of the flow rate of air 65.

Figure 3:
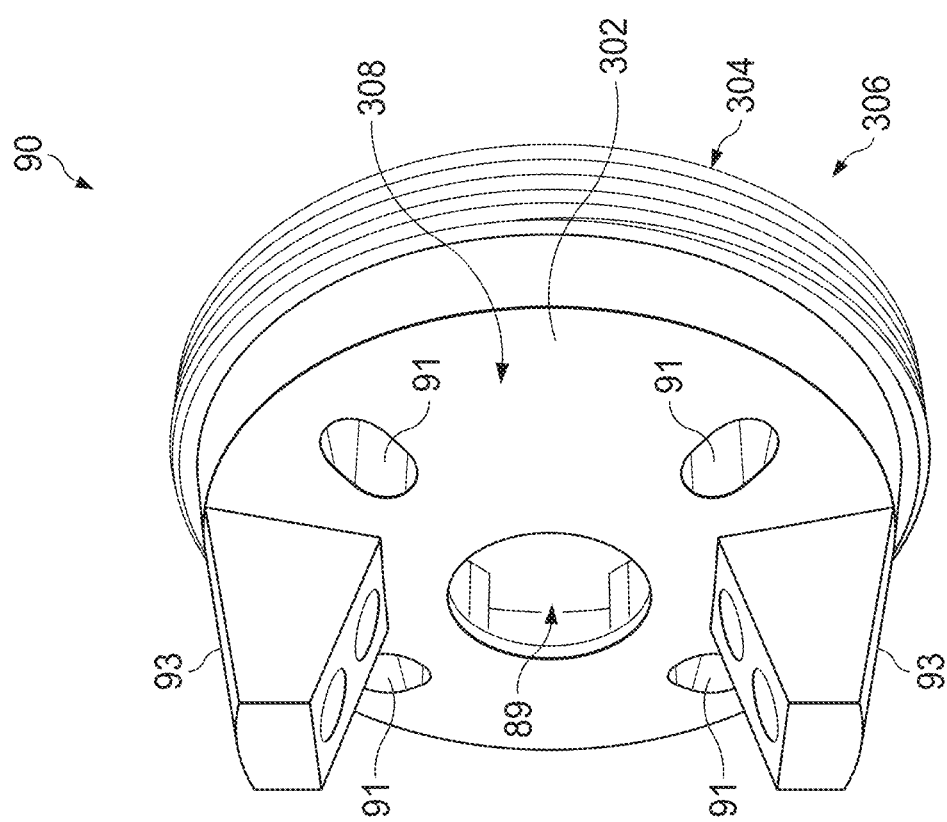
FIG. 3 shows a pictorial illustration of a fluid release cap in accordance with one or more embodiments of the present disclosure.

To atomize cleaning agent 50 using air spray atomization, in one or more embodiments, a fluid release cap 90 may be included with animal cleaning tool 20. FIG. 3 and FIG. 4 show an example of a fluid release cap such as fluid release cap 90. FIG. 3 shows an exemplary, non-limiting, pictorial illustration of a fluid release cap 90 that may be used in one or more embodiments of an animal cleaning tool 20, including the one or more embodiments shown in FIG. 9-12. In one or more embodiments, fluid release cap 90 may be fit within an opening of bottom plate 64 so as to extend from one side of bottom plate to the other side of bottom plate 64.

As shown in FIG. 3, fluid release cap 90 may be a cap having a body 302 that includes a set of air cap holes 91. As shown in FIG. 3, set of air cap holes 91 are arranged circumferentially around a central aperture 89 and are holes or openings through which air, such as air 65, may be emitted. Those of ordinary skill in the art will appreciate that there is no limitation herein with respect to the location of central aperture 89 or set of air cap holes 91. In one or more embodiments, more or less air cap holes 91 than those shown in FIG. 3 may be used. As shown in FIG. 3 and elsewhere, fluid release cap 90 may have a generally circular or cylindrical shape. Alternatively, fluid release cap 90 may have any other shape as desired.

Fluid release cap 90 may be removeably coupled to bottom plate 64 and may be threaded (e.g., via threads 304) to a designated location in top housing portion 38 of animal cleaning tool 20. When fluid release cap 90 is located in its place, outer surface 308 of fluid release cap 90 may be oriented to the surface of an animal 10 and may be directed to face outwardly from bottom plate 64. A bottom surface 306 of fluid release cap 90 may be oriented towards an interior of top housing portion 38 and may be fitted through an appropriately, suitably sized opening dedicated to fluid release cap 90, whereby the suitably sized opening is located in bottom plate 64.

In one or more embodiments, fluid release cap 90 may be removeably coupled to one or more exit cleaning agent tubes(s) 96 that are in fluid communication with cleaning agent supply conduit 62 in top housing portion 38. Other means known in the art for coupling fluid release cap 90 may be used including without limitation one or more fasteners, adhesives, and/or welding. In one or more embodiments, fluid release cap 90 may be integrally formed with top housing portion 38 or bottom plate 64.

Fluid release cap aperture 89, in one or more embodiments, may be centrally located on an outer surface 308 of fluid release cap 90. In one or more embodiments, a dispensation end 108 of nozzle 69 may extend through the fluid release cap aperture 89. In one or more embodiments, nozzle 69 may be a precision device that facilitates dispersion of liquid into a spray. Nozzle 69 may be any type of nozzle as known in the art, including without limitation a single fluid nozzle, a plain-orifice nozzle, a shaped-orifice nozzle, a surface-impingement single-fluid nozzle, or a pressure swirl spray nozzle to name some exemplary nozzles without limitation.

Figure 6:
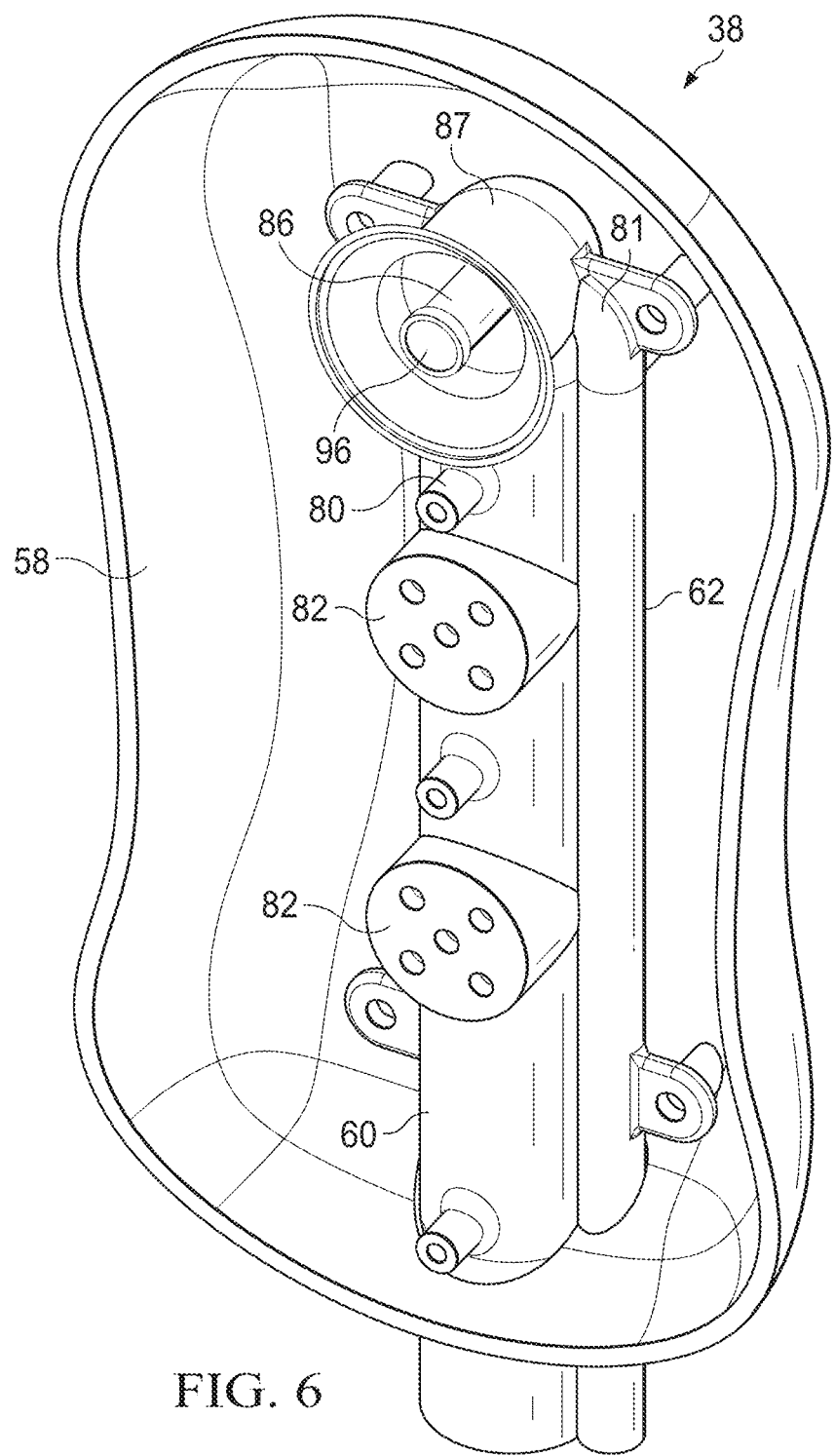
FIG. 6 shows a partial sectional view of an interior of a top portion of an animal cleaning tool taken along section line of FIG. 5.
Figure 10:
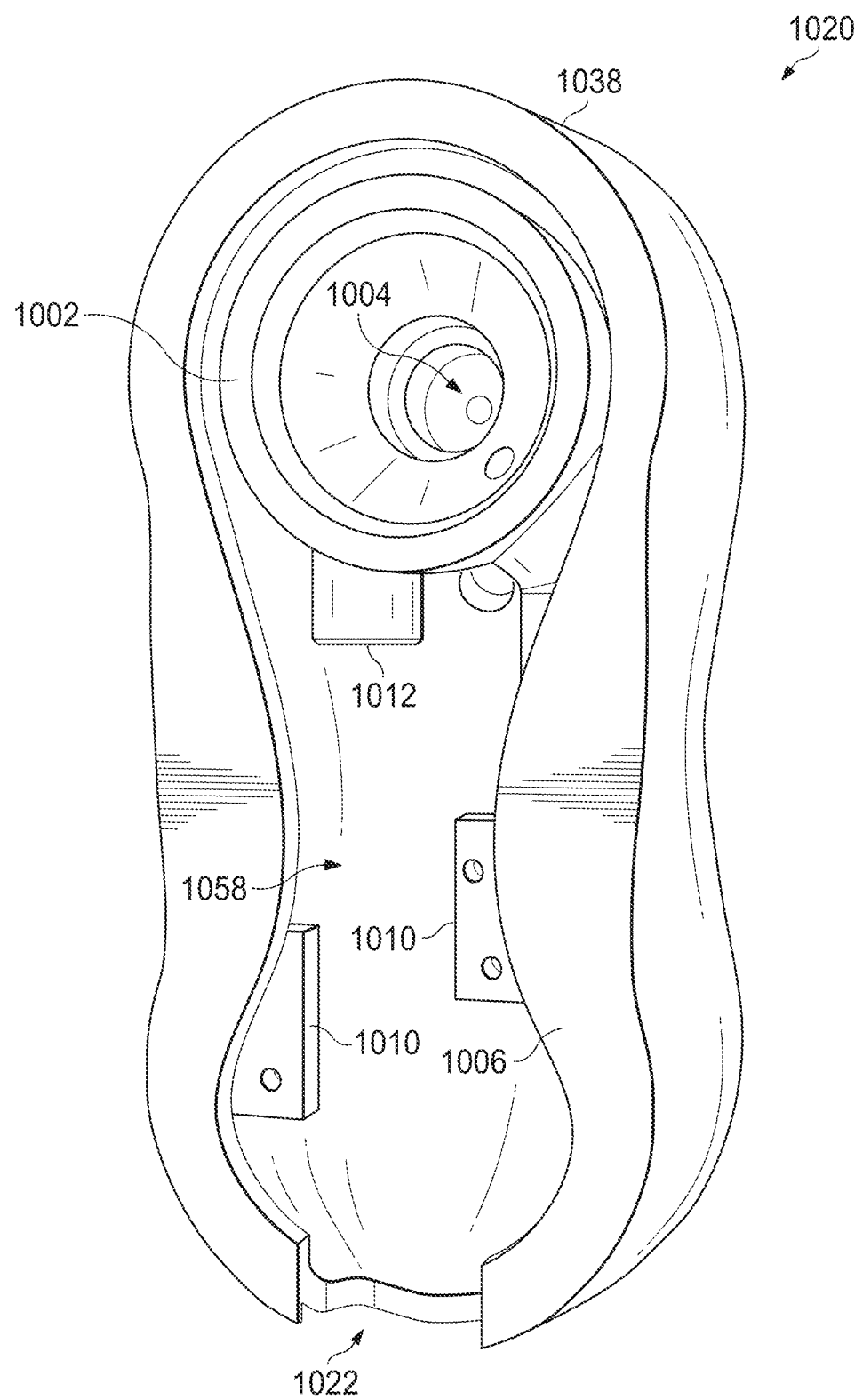
FIG. 10 shows a pictorial illustration of an interior view of a top housing portion of an alternative embodiment of an animal cleaning tool in accordance with one or more embodiments of the present disclosure.

In one or more embodiments, a base end 106 or bottom portion of nozzle 69 may be fastened to or fit into an end or release point for cleaning agent supply conduit 62 (e.g., end opening of exit cleaning agent tube 86 as shown in FIG. 6 or in nozzle 1004 in FIG. 10). Nozzle 69 may be of any size, but in one or more embodiments, may be relatively small in height. Nozzle 69 may be selected to release droplets of any size. Nozzle may be removeably or non-removeably coupled to an end of cleaning agent supply conduit 62.

During operation, in one or more embodiments, a base end 106 of nozzle 69 may be fit into an end opening of cleaning agent conduit 62 (e.g., end opening of exit cleaning agent tube 86 as shown in FIG. 6 or in nozzle aperture 1004 in FIG. 10) while the dispensing end of nozzle 69 may extend through fluid release cap aperture 89. Air may be released through set of air cap holes 91 as cleaning agent 50 is emitted from dispensation end 108 of nozzle 69 (e.g. nozzle 69 as shown in FIG. 9). As shown in FIG. 3, air 65 may be ejected from each one of the set of air cap holes 91 that are arranged around fluid release cap aperture 89 (i.e., dispensation end of 108 of nozzle 69 when nozzle 69 is in place).

Further, in one or more embodiments, fluid release cap 90 may include air hole members 93. As shown in FIG. 3, air hole members 93 are structural members that include in an exemplary, non-limiting embodiment a set of two air cap holes on each of the air hole members 93 bodies. The air hole members 93 may protrude outwardly in a vertical orientation from an outer surface 308 of fluid release cap 90. During operation, when nozzle 69 is in place and the air has been activated to be released through air supply conduits 52 and 60, air 65 may also be emitted from the set of air cap holes disposed on air hole members 93. Thus, a concentrated volume of air is directed towards cleaning agent 50 as cleaning agent is being ejected from the dispensing end 108 of nozzle 69 (e.g., as shown in FIG. 9). It may be beneficial to include air hole members 93 and set of air cap holes to atomize cleaning agent 50 as an atomized spray 104 (i.e., as a spray of particles or droplets). Cleaning agent 50 may thus be emitted onto a surface of an animal as a spray of particles or droplets as opposed to a clump, glob, blob, or puddle of cleaning agent 50 on the animal 10's various parts. Thus, a benefit as discovered herein using animal cleaning tool 20 is reduced liquidity while washing animal 10. The combination of cleaning agent 50 and air provides a light, airy application of atomized spray 104 as small droplets so as to allow the owner to control the liquidity distributed onto a surface of animal 10. In other words, even though cleaning agent 50 is emitted onto animal's 10 coat, skin, hair, or fur, the additional spray of air reduces the potential or prevents from an over-depositing of cleaning agent 50 because the cleaning agent 50 may be emitted in droplet form. Further, in one or more methods of using animal cleaning tool 20, an owner may brush the surface of the animal as atomized spray 104 is emitted, thus allowing the owner to quickly and efficiently brush the atomized spray 104 into the surface of the animal 10 such that the atomized spray 104 is evenly distributed over the entirety of an animal's 10 surface.

While a method using air spray atomization has been described above, other atomization methods and techniques may also be used such as, without limitation, airless atomization, centrifugal atomization, electrostatic atomization, or ultrasonic atomization. The following is a brief description of these above-listed methods. Airless (or pressure) atomization may occur when high pressure forces fluid through a relatively small nozzle. The fluid (e.g., cleaning agent 50) may emerge as a solid stream or sheet at a high speed. The friction between the fluid and the air may act to disrupt the stream, breaking the stream into fragments initially and ultimately into droplets.

Centrifugal atomization, also known as rotary atomization, may occur when a nozzle, such as nozzle 69 introduces fluid (e.g., cleaning agent 50) at the center of a spinning cup or disk (not shown). Centrifugal force may carry the fluid to the edge of the disk and throw the fluid off of the edge. The liquid may form ligaments or sheets that break into droplets. As known in the art, the energy source for rotary atomization is centrifugal force. In one or more embodiments, animal cleaning tool 20 may include components for centrifugal atomization to occur.

Electrostatic atomization exposes a fluid to an intense electric field between a charged atomizer and ground work piece. The charge transfers to the fluid and repulsive forces between the atomizer and the fluid tear the droplets from the atomizer and send them toward the work surface. With respect to ultrasonic atomization, ultrasonic atomization relies on an electromechanical device that vibrates at a very high frequency. Fluid (e.g., cleaning agent 50) may pass over the vibrating surface and vibration may cause the fluid to break into droplets. Thus, one or more embodiments of an animal cleaning tool 20 may utilize any of these alternative methods for atomization.

With respect to an activation mechanism, in one or more embodiments, at least one or more activation mechanism(s) 22 may be located on cleaning tool 20. As shown in FIG. 2 and FIG. 8, in one or more embodiments, at least one activation mechanism 22 may be disposed anywhere on an outer surface of cleaning tool 20. In an exemplary, non-limiting, illustrative embodiment, FIG. 2 shows activation mechanism 22 disposed on an outer surface of top housing portion 38. Activation mechanism 22 may be configured as any type of selector known to those of ordinary skill in the art, and may be configured as a button, trigger, knob, toggle, release, or any other type of selector known to those in the art that may be used to control one or more functions of the cleaning tool 20. In one or more embodiments, a user, such as user 42, may select activation mechanism 22 in order to activate a release of air 65, cleaning agent 50, or both air 65 and cleaning agent 50 from cleaning tool 20 onto a surface of animal 10 in order to wash, clean, and also dry a moist and/or dirty outer surface of animal 10. Alternatively, in one or more embodiments, activation mechanism 22 may be configured to solely activate a release of cleaning agent 50 from fluid supply unit 34 to cleaning tool 20, whereas a separate selector (e.g., selector 21) may be located on fluid supply unit 34 to activate a release of air 65. In other embodiments, an activation mechanism, such as activation mechanism 22 that is located on animal cleaning tool 20 may also be configured to turn on/off fluid supply unit 34.

As known by those of ordinary skill, control circuit wiring may be coupled between activation mechanism 22 and fluid supply unit 34 such that activation mechanism 22 may be in signal communication with fluid supply unit 34 and power supply 36. Electrical wiring (not shown but readily understood by those of ordinary skill) may also run from the activation mechanism 22 to fluid supply unit 34 and one or more components of fluid supply unit 34 in order for activation mechanism 22 to perform an activation function. For example, in one or more embodiments, wiring may run from activation mechanism 22 to one or more components (including electrical components) of fluid supply unit 34 such that activation mechanism 22 may be used to either turn on/off fluid supply unit 34, and/or for activation mechanism 22 to release cleaning agent 55 from fluid supply unit 34 to animal cleaning tool 20 and one or more conduits, and/or for activation mechanism 22 to also release air 65 from fluid supply unit 34 to one or more conduits. Electrical wiring may also be included in animal cleaning tool. 20 to connect to a power supply source, such as power supply source 36, or a power source not coupled to fluid supply unit 34.

In addition to the above, in one or more embodiments, animal cleaning tool 20 may include selectors 21 which may be any type of input selector for a user to select one or more functions or features associated with animal cleaning tool. 20. Selectors 21 may include any type of button, slide, toggle, touchscreen, keypad, or other selectors as known in the art. Further, fluid supply unit 34 may include any number of selectors, such as selectors 21, for selecting one or more functions for fluid supply unit 34. Selectors 21 may be operated by either mechanical or electrical mechanisms, or a combination thereof. As known in the art, electrical wiring (not shown) may be used to run from one or more selectors 21 located on animal cleaning tool 20 or fluid supply unit 34 in order for selectors 21 to be in signal communication with one or more components of either animal cleaning tool 20 or fluid supply unit 34.

In one or more embodiments, a selector 21 may be provided on fluid supply unit 34 that is specially adapted for turning on and off fluid supply unit 34, for releasing cleaning agent 50, or activating and/or releasing air 65 from fluid supply unit 34. In one or embodiments, air 65 may be automatically emitted from an outlet 24 of fluid supply unit 34 once fluid supply unit 34 is initially turned on. Alternatively, in other embodiments, a user may select a selector (e.g., selector 21) to separately activate and release air 65 from an outlet (e.g., outlet 28) of fluid supply unit 34.

FIG. 2 shows a non-limiting, pictorial illustration of a system using animal cleaning tool 20, supply hose 26, and fluid supply unit 34. As shown in FIG. 2, in one or more embodiments, animal cleaning tool 20 may be coupled to a fluid supply unit 34 having a supply of air (e.g., air 65) that may be directed to cleaning tool 20 via supply hose 26. Animal 10 as shown in FIG. 2 may be located proximate to the animal cleaning tool 10 and fluid supply unit 34. Animal 10, in one or more embodiments, may be a household pet, such as a dog or cat, without limitation.

As described above, supply hose 26 may include a conduit (e.g., conduit 52 which is not shown in FIG. 2) that is dedicated to channeling air 65 from fluid supply unit 34 to animal cleaning tool 20. Further, fluid supply unit 34 may include a cleaning agent reservoir 32 containing cleaning agent 50. As described above, in one or more embodiments, supply house 26 may include a conduit (e.g. conduit 59 which is not shown in FIG. 2) for channeling cleaning agent 50 from fluid supply unit 34 to animal cleaning tool 20.

In embodiments having a power cord for supplying direct electrical current to the one or more electromechanical components of fluid supply unit 34, a user may plug in the power cord to any available outlet. Alternatively, if fluid supply unit 34 includes one or more batteries (of any type known in the art), the fluid supply unit 34 may be turned on and off by depressing an associated power activation button or mechanism (e.g., selector 21).

To facilitate transporting and moving fluid supply unit 34 from one location to another, a user 42 may take hold or grasp a handle assembly, such as handle assembly 44, of fluid supply unit 34 and move to a desired location. While fluid supply unit 34 is illustrated in FIG. 2 as located on a ground surface, in other embodiments, fluid supply unit 34 may be located on top of any surface convenient to user 42.

Once fluid supply unit 34 is powered on, in one or more embodiments, air 65 may begin to be directed through hose 26 from air supply source 56. Accordingly, if an air blower, fan, air compressor, or any combination thereof is disposed within fluid supply unit 34, these air supply devices begin to circulate and direct air 65 to supply hose 26. More specifically, in one or more embodiments, flowing air 65 may be directed from air supply source 56 within fluid supply unit 34 to air supply conduit 52 within supply hose 26. As air flows through air supply conduit 52, the air may be directed to flow through one or more air supply conduits 60 located in an internal cavity 58 of cleaning tool 20. Air 65 may then be ejected from a set of air openings 66 disposed on a bottom plate 64 of cleaning tool 20.

Subsequent to releasing air from the cleaning tool 20, a user may selectively choose to brush a surface of animal 10 using cleaning tool 20 while only air 65 is being ejected from cleaning tool 20 (i.e., no cleaning agent 50 is released onto a surface of animal 10). Accordingly, user 42 may contact a bottom plate 64 of cleaning tool 20 onto any part of animal 10 by placing animal cleaning tool 20 onto the desired part of animal 10. User 42 may then proceed to move cleaning tool 20 over and around the surface of animal 10, concentrating on any specific areas on animal 10 if needed. When bottom plate 64 makes contact with a surface of animal 10, the set of brushing elements 40 also make contact with the surface of animal 10. Accordingly, user 42 may begin brushing the outer surface of animal 10. Meanwhile, during the brushing, air 65 may be continuously emitted from animal cleaning tool 20. If animal 10 is wet for any reason, the act of brushing animal 10 while dispensing air 65 over the surface of animal 10 may beneficially assist in removing or reducing unwanted moisture, fluids, dirt, debris, and even ticks/fleas, or unwanted hair from animal 10.

Subsequently, a user may selectively activate one or more selectors or mechanisms e.g., 21 or 22) for dispensation of cleaning agent 50 from cleaning tool 20 onto a surface of animal 10. In one or more embodiments, when user 42 selects activation mechanism 22, cleaning agent 50 may be triggered to be channeled from cleaning agent reservoir 32 on fluid supply unit 34 and directed towards cleaning tool 20.

As discussed above, in one or more embodiments, a cleaning agent conduit, such as cleaning agent conduit 54 may be in fluid communication with cleaning agent reservoir 32 and/or fluid supply unit 34 so as to provide the needed cleaning product. Further, in one or more embodiments, cleaning agent conduit 54 may be in fluid communication with cleaning agent conduit 62 located within an internal cavity 58 of cleaning tool 20. Upon selecting or engaging activation mechanism 22, cleaning agent 50 may begin to be ejected from one or more apertures disposed in an outer surface of cleaning tool (e.g., from a dispensing end 108 of nozzle 69) (e.g., as shown in FIG. 9) which may extend through fluid release cap aperture 89 of fluid release cap 90. As cleaning agent 50 is released from cleaning tool 20, user 42 may move the cleaning tool 20 over the surface of animal 10 so as to deposit the dispensing cleaning product on any part of animal 10. When placing cleaning tool 20 directly onto surface of animal 10, cleaning agent 50 is dispensed onto any part of animal 10 and also brushed into the surface of animal 10 due to the set of brushing elements 40 that brush cleaning agent 50 through animal 10's coat, hair, or fur.

In one or more embodiments, because cleaning agent 50 is dispensed as a fine spray of particles i.e., atomized spray 104), upon spraying animal 10, user 42 may not need to exert extra effort in drying animal 10. This may be because the atomized cleaning agent 50 is brushed into and dispersed throughout animal 10 in small droplets, which may evaporate on their own or may be absorbed into the hair, fur, or skin of animal 10. Further, as previously discussed, in one or more embodiments, cleaning agent 50 may be composed of a reduced or minimal amount of water so that animal 10 does not become "soaked" with water upon applying cleaning agent 50. Thus, it is an aspect of the present disclosure, that the arrangement of cleaning agent 50 as atomized droplets and dispensing as such onto animal 10, provides a way to apply a cleaning product and thoroughly clean animal 10 without using tremendous amounts of water either before applying the cleaning product (i.e., cleaning agent 50) or after applying the cleaning product. Nevertheless, it is a benefit that in one or more embodiments of animal cleaning tool 20, air 65 is released from animal cleaning tool 20 after cleaning agent 50 has been deposited (e.g., as an atomized spray 104). In one or more embodiments, air 65 may be released from a set of exit air openings 66 and/or from air holes 91 in fluid release cap 90. The released air 65 may assist in drying any moisture after cleaning agent 50 is deposited onto animal 10 and while user 42 is brushing the outer coat of animal 10.

FIG. 4 shows a perspective view of an animal cleaning tool 20 according to embodiments of the present disclosure. FIG. 4 shows a non-limiting, illustrative embodiment of cleaning tool 20 having a top housing portion 38 with curving sidewalls 74 on either side. In some embodiments, it may be beneficial to have such curving sidewalls 74 so as to facilitate grasping and holding onto the body 38 of cleaning tool 20 and for ease of maneuverability of cleaning tool 20. Those of ordinary skill in the art will appreciate that sidewalls 74 may have any form or shape, including not curving inwardly or outwardly.

Accordingly, in one or more embodiments, a top surface 72 of cleaning tool 20 may be adapted for fitting in a palm of a user's hand, while a bottom surface 73 of cleaning tool 20 may be directed or oriented towards an outer surface of an animal. Those of ordinary skill in the art may appreciate that alternative configurations and designs may be used for cleaning tool 20.

As shown in FIG. 4, cleaning tool 20 may include other useful elements previously discussed, including a set of brushing elements 40 which may protrude from a first side 98 of bottom plate 64. Further, as shown in FIG. 4, a set of exit air openings 66 may be disposed and extend from a front side (e.g., first side 98) of bottom plate 64 to a reverse side (not shown) of bottom plate 64. A set of exit air openings 66 may be arranged in one or more embodiments so as to be somewhat distanced apart from one another. In one or more embodiments, set of exit air openings 66 may be arranged on a longitudinal axis of cleaning tool 20, as shown in FIG. 3 and FIG. 4. Alternatively, the set of exit air openings 66 may be arranged on a lateral axis or a combination of both a lateral and longitudinal axis of bottom plate 64.

As shown in FIG. 4, fluid release cap 90 may be coupled to a first side 98 (i.e., the outward oriented side) of bottom plate 64 of animal cleaning tool 20. In one or more embodiments, bottom plate 64 may be a plate-like member that may be attached and detached from top housing portion 38 of cleaning tool 20. Thus, a number of fasteners 71 (including any fastener known in the art) may be used to couple bottom plate 64 to top housing portion 38 of cleaning tool 20. One of ordinary skill in the art will appreciate that fasteners 71 may be located anywhere on cleaning tool 20 for removeably coupling bottom plate 64 to top housing portion 38 of cleaning tool 20, and are not limited to the placement and locations shown in FIG. 4.

In accordance with one or more embodiments of the present disclosure, fluid release cap 90 in FIG. 4 may include a set of air cap holes 91, air hole members 93, and a fluid release cap aperture 89 (as shown in FIG. 3 and described above). In one or more embodiments, a dispensation end 108 of nozzle 69 (not shown in FIG. 4) may extend through fluid release aperture 89 of fluid release cap 90.

As shown in FIG. 4, air supply conduit 52 and cleaning agent conduit 54, may be in fluid communication with an interior cavity 58 (not shown in FIG. 4) of animal cleaning tool 20. Accordingly, air supply conduit 52 and cleaning agent conduit 54 may extend through an inlet 24 of cleaning tool 20. Although not shown in FIG. 4, in one or more embodiments, an outer hose, such as supply-hose 26 shown in FIG. 2, may enclose air supply conduit 52 and cleaning agent conduit 54. Alternatively, in other embodiments, supply hose 26 may be formed as a dual conduit having air supply conduit 52 and cleaning agent conduit 54 forming a single hose without an additional hose enclosing the conduits. In one or more embodiments, air supply conduit 52 may be joined together with cleaning agent conduit 54 (as shown in FIG. 1) so as to be joined along an outer boundary of both conduits 52 and 54. In one or more embodiments, the diameter of air supply conduit 52 may be larger than the diameter of cleaning agent supply conduit 54. As shown in FIG. 4, in a non-limiting, exemplary illustrative embodiment, cleaning agent supply conduit 52 may be narrower than air supply conduit 54. This narrower diameter of cleaning agent supply conduit 52 may beneficially assist cleaning agent 50 to be deposited as atomized or small particles onto an animal surface, rather than having larger puddles or volume of cleaning agent 50 be deposited onto an animal. Thus, the narrower diameter of cleaning agent supply conduit 62 may contribute to the controlled application of cleaning agent 50 as smaller particles or droplets. Those of ordinary skill in the art will appreciate that in alternative embodiments, air supply conduit 52 and cleaning agent supply conduit 54 may have a same diameter. In yet other embodiments, the diameter of cleaning agent supply conduit 54 may be larger than the diameter of air supply conduit 52.

In one or more embodiments, air supply conduit 52 and cleaning agent supply conduit 54 may be disposed at a distal end 75 of top housing portion 38. Distal end 75 of top housing portion 38 may in some embodiments, be a lower rear portion of top housing portion 38. Accordingly, in some embodiments, air supply conduit 52 and cleaning agent supply conduit 54 may be positioned further from a top surface 72 of a body 38 of cleaning tool 20. This may be beneficial for a user who may be gripping top surface 72 in a palm of a user's hand, and thus avoid the conduits (e.g., 52 and 54) becoming a nuisance to or get entangled with user 42.

It is noted that the air that may be released from a set of exit air openings 66 (e.g., as shown in FIG. 4) may assist in calming and relaxing an animal, e.g. animal 10. Animals, including pets such as dogs and cats, may become distressed upon being forced to bathe or be washed with water, soap, and/or shampoos. The act of releasing and circulating air over an animal may contribute to relaxing animal 10 and may assist in keeping animal 10 calm and as still as possible. In addition, because it may be feasible to regulate the air flow, the air that is dispensed over the animal may be set at lower pressures and a lower velocity so as to further assist in keeping the animal calm.

Turning to FIG. 5 and FIG. 6, FIG. 5 shows a partial cut away view of a cleaning tool or device according to embodiments of the present disclosure and FIG. 6 shows a partial sectional view of an animal cleaning tool according to embodiments of the present disclosure taken along section line 1-1 of FIG. 5. As shown in FIG. 5, a top housing portion 38 of animal cleaning tool 20 may be coupled to bottom plate 64 along a bottom surface of top housing portion 38 according to one or more embodiments of the present disclosure. Further, as shown in FIG. 5 and FIG. 6, air supply conduit 52 and cleaning agent supply conduit 54 that extend from fluid supply unit 34 may be in fluid communication with corresponding air supply conduit 60 and cleaning agent conduit 62 that extend within an internal cavity 58 of cleaning tool 20. To clarify, in one or more embodiments, an inlet for air supply conduit 60 and an inlet for cleaning agent supply conduit 62 may be in alignment, respectively, with an outlet for air supply conduit 52 and an outlet for cleaning agent conduit 54.

In one or more embodiments, at an inlet 24 of cleaning tool 20, air supply conduit 52 and cleaning agent supply conduit 54 may be connected, respectively, to air supply conduit 60 and cleaning agent supply conduit 62 located within top housing portion 38 of animal cleaning tool 20. Any type of connection tools and methods may be used as known in the art to connect conduit 52 to conduit 60 and to connect conduit 54 to conduit 62, including any type of fasteners, such as without limitation, bolts, screws, pins, and/or clips.

It is noted that in one or more embodiments, while air supply conduit 52 and cleaning agent conduit 54 may be formed from a material or combination of materials that allows air supply conduit 52 and cleaning agent conduit 54 to be relatively elastic, stretchable, and pliable for greater ease of movement and manipulation by a user, the material used to form air supply conduit 60 and cleaning agent conduit 62 may be of a harder, more rigid material or combination of materials. For example, air supply conduit 60 and cleaning agent conduit 62 may be formed having a more rigid, less pliant outer and inner surfaces, because air supply conduit 60 and cleaning agent conduit 62 are located within internal cavity 58 and may need to be more rigid than air supply conduit 52 and cleaning agent conduit 54. Nevertheless, those of ordinary skill in the art may appreciate that air supply conduit 60 and cleaning agent conduit 62 may be made of any material known in the art. As shown in FIG. 4 and FIG. 5, in one or more embodiments, air supply conduit 60 and cleaning agent conduit 62 may be disposed generally parallel to a bottom surface of top housing portion 38.

It is noted that in one or more embodiments, air supply conduit 60 within animal cleaning tool 20 may be part of air supply conduit 52 in supply hose 26, and cleaning agent conduit 62 may be a part of cleaning agent supply conduit 54 in supply hose 26. Accordingly, in one or more embodiments, the conduits may not necessarily be separate pieces or separate conduits that need to connected, respectively, together. Rather, these conduits may be formed as a whole conduit, whereby air supply conduit 60 is integrally formed with air supply conduit 52 and cleaning agent conduit 62 is integrally formed with cleaning agent supply conduit 54.

As shown in FIG. 5, in a non-limiting, illustrative embodiment, there may be one or more alignment tubes 80 that descend from a lower part of the outer surfaces of air supply conduit 60 and cleaning agent conduit 62. In one or more embodiments, a fastener, such as fastener 71 (shown in FIG. 3 and FIG. 4) may be disposed in the opening (not shown) provided at a distal end of alignment tube 80. In one or more embodiments, bottom plate 64 may be removeably attached or coupled to top housing portion 38 of cleaning tool 20 by disposing a fastener, such as fastener 71 through an opening (not shown in FIG. 5) provided at a distal end of alignment tube 80. Thus, in some embodiments, a user may use another tool, such as, without limitation, a screwdriver, pliers, wrench, or other tool for positioning and removing fastener 71 in one or more openings of alignment tubes 80.

As discussed above, one of ordinary skill in the art may envision alternative means of coupling bottom plate 64 to top housing portion 38 without using fasteners 71 and disposing fasteners 71 in alignment tube 80 and fastener holes 70 of bottom plate 64. For example, removable clips, pins, or other mechanical couplers may hinge over any side of top housing portion 38 and may be configured to engage with a receiving part on bottom plate 64.

Further, it is noted that in one or more embodiments, it may feasible to couple bottom plate 64 to a top housing portion 38 whereby bottom plate 64 may snap into place against a bottom surface of top housing portion 38. It is noted that in one or more embodiments, a profile of an outer perimeter of bottom surface of top housing portion 38 may match or conform to a profile of bottom plate 64.

It may be desirable to readily replace bottom plate 64. In one or more embodiments, a number of different bottom plates 64 having different configurations and arrangements of set of brushing elements 40 and/or set of exit air openings 66 may be provided with animal cleaning tool 20 Such alternative and exchangeable bottom plates 64 may be useful for a number of reasons. For example, a user such as user 42 may utilize different bottom plates 64 that are better suited to different animals, including different sized animals.

Further, in one or more embodiments, one or more flanges 81 may be disposed in internal cavity 58 to couple an outer part of air supply conduit 60 and/or cleaning agent conduit 62 to one of the inner walls or inner surfaces of a top housing portion 38 of cleaning tool 20. As shown in FIG. 5, flange 81 may be used to couple an outer surface of air supply conduit 60 and cleaning agent supply conduit 62 to an upper portion of an inner wall of a top housing portion 38 of cleaning tool 20. A flange, such as flange 81, may be affixed to an inner wall of top housing portion 38 by any affixation method or component known in the art. For example, flange 81 may be affixed, without limitation, using any type of fastener, welding, or integral formation with top housing portion 38.

In one or more embodiments, there may be one or more exit air tubes 82 located within internal cavity 58 of top housing portion 38. In one or more embodiments, exit air tubes 82 may be additional conduits (e.g. tubes) that may be in fluid communication with air supply conduit 60. As shown in FIG. 5, in a non-limiting, illustrative embodiment, a first exit air tube 82 is disposed closer to an inlet 24 of top housing portion 38 and a second exit air tube 82 is disposed proximate to a center axis or center portion of top housing portion 38 of cleaning tool 20. In one or more embodiments, an exit air tube 82 may be coupled to and/or be oriented away from air supply conduit 60 of cleaning tool 20, including by being oriented substantially perpendicular to a longitudinal axis of air supply conduit 60. Those of ordinary skill in the art may appreciate that there may be other arrangements and configurations of exit air tubes 82 other than what is shown as an exemplary arrangement in FIG. 5.

In one or more embodiments, an opening at a distal end of exit air tubes 82 may align with one or more exit air openings 66 disposed on a bottom plate 64. Accordingly, when bottom plate 64 may be coupled or connected (removeably or otherwise) to top housing portion 38 of cleaning tool, an opening at a distal end of exit air tubes 82 (i.e., the opening that is furthest from the air supply conduit 60) may be disposed above or substantially over a plurality of exit air openings 66 of bottom plate 64.

When air flow is being supplied to air supply conduit 60, in one or more embodiments, air may flow through air supply conduit 60 in top housing portion 38 of cleaning tool 20, through exit air tubes 82, and out through a set of exit air openings 66 which may extend from one side of bottom plate 64 to the other side. Thus, when bottom plate 64 is coupled to top housing portion 38, air 65 that is directed to exit air tubes 82 is subsequently emitted from set of exit air openings 66 located in or coupled to bottom plate 64.

In addition to the above, in one or more embodiments, an exit outer air tube 87 may be in fluid communication with a terminal end of air supply conduit 60 in top housing portion 38. Air 65 may be directed through exit outer air tube 87 during an atomization process using air spray atomization. In one or more embodiments, air 65 directed from exit outer air tube 87 is used during an air spray atomization process. As shown in FIG. 5, in one or more embodiments, there may be a tapering portion 92 that tapers from a terminal end of exit cleaning agent tube(s) 87. In one or more embodiments, fluid release cap 90 (as shown, for example, in FIG. 3 and FIG. 4) may be threadably or non-threadably coupled to the bottom surface of tapering portion 92 of exit cleaning agent tube 86. In one or more embodiments, when fluid release cap 90 is disposed within an opening allocated in bottom plate 64 for fluid release cap 90, fluid release cap 90 may be sealingly engaged with exit cleaning agent tube(s) 87. Fluid release cap 90 may be of any size and/or diameter suitable for its application and location.

Thus, in one or more embodiments, fluid release cap 90 couples to exit outer air tube 87 (e.g. at tapering portion 92), and air 65 may be emitted from exit outer air tube 87 through one or more air cap holes 91 located on fluid release cap 90 and also located on air members 93.

In one or more embodiments, exit air tubes 82 and exit outer air tube 87 may be coupled to and/or be oriented away from air supply conduit 60, including by being oriented substantially perpendicular to a longitudinal axis of air supply conduit 60. Those of ordinary skill in the art may appreciate that there may be other arrangements and configurations of exit air tubes 82 and exit outer air tubes 87 other than what is shown as an exemplary arrangement in FIG. 5 and FIG. 6.

As shown in FIG. 5 and FIG. 6, cleaning agent supply conduit 62 may also be directed to a terminal end point within internal cavity 58 of top housing portion 38 of animal cleaning tool 20. In one or more embodiments, when bottom plate 64 is coupled or connected to a top housing portion 38 of cleaning tool 20, exit cleaning agent tube 86 (as shown in FIG. 6) may be aligned with fluid release cap 90 which may extend through a designated opening located on bottom plate 64. In one or more embodiments, a nozzle, such as nozzle 69 (not shown) may be fit within an end opening of exit cleaning agent tube 86, such as exit cleaning agent aperture 96 shown in FIG. 6. Thus, exit cleaning tube 86 may be configured to direct cleaning agent 50 through an attached nozzle 69. Subsequently cleaning agent 50 may be directed outwardly from a dispensing end 108 of nozzle 69, whereby the dispensing end 108 extends through fluid release cap aperture 89 (see e.g., FIG. 9).

Thus, one or more embodiments provided in the present disclosure may advantageously include guides and aids in the form of alignment tube(s) 80, exit air tube(s) 82, and exit cleaning agent tube(s) 86 that may assist a user when coupling bottom plate 64 to top housing portion 38, because these tubes allow for a user to understand how to position bottom plate 64 and where to locate various openings (e.g. plurality of exit air openings 66 and fastener holes 70) when coupling bottom plate 64 to top housing portion 38.

Accordingly, FIG. 6 shows a partial sectional view of an interior of top housing portion 38 of an animal cleaning tool 20 taken along section line 1-1 of FIG. 5. FIG. 6 also shows internal cavity 58. In looking at the exemplary, non-limiting, illustrative embodiment of top housing portion 38 as shown in FIG. 6, one of ordinary skill may perceive that top housing portion 38 may be contoured to correspond to a shape of bottom plate 64 in one or more embodiments. Accordingly, a perimeter of top housing portion 38 in one or more exemplary embodiments may correspond to a perimeter of bottom plate 64.

In one or more embodiments, as shown in FIG. 6, one part of air supply conduit 60 may connect to exit air tubes 82 while another part of air supply conduit 60 is directed to exit outer air tube 87. Alternatively, in other embodiments, two separate conduits channeling air solely to either exit air tubes 62 or solely to exit air openings 66 may be used.

In one more embodiments, upon powering an air supply source (e.g., air supply source 56), flowing air may initially be directed through air supply conduit 60 of top housing portion 38 and through one or more exit air tube(s) 82, which may be in alignment with a plurality of exit air openings 66 disposed in bottom plate 64. Further, it may be feasible for flowing air 66 to initially be automatically be directed to flow out of exit outer air tube 87 even if none of the cleaning agent 50 is being dispensed from cleaning agent aperture 96 (e.g., via nozzle 69). Accordingly, a user, such as user 42, may have a greater volume of air being dispensed initially from cleaning tool 20 onto animal 10 to dry or brush off any unwanted hair, fur, or debris, without necessarily depositing any cleaning agent 50 onto a surface of animal 10. Thus, animal cleaning tool 20 may be used as a "dryer", whereby no cleaning agent 50 is released from fluid supply unit 20. Rather, solely air may be released from set of exit air openings 66 and from air holes 91 in fluid release cap 90 onto a surface of an animal 10. Activating the air supply source to blow air (without a release of cleaning agent 50), such as air 65 from fluid supply unit 34 onto animal 10 may beneficially allow an owner to dry animal 10 when animal 10 is moist or wet. Further, blowing air may assist in deshedding animal 10.

Subsequent to the initial directing of flowing air 65 to one or more exit air tube(s) 84, according to one or more non-limiting methods disclosed in the present disclosure, air 65 may be solely or primarily directed to exit outer air tube 87 such that air 65 is not released from exit air tube(s) 82 and through a set of exit air openings 66 in bottom plate 64. Rather, flowing air 65 may be directed to flow exclusively through air supply conduit 60 to exit outer air tube 87 so as to release a maximum amount of air 65 to fluid release cap 90 while cleaning agent 50 is being atomized into an atomized spray (e.g. atomized spray 104). Thus, in one or more non-limiting embodiments, by directing an entirety of air 65 from fluid supply unit 34 to fluid release cap 90 and the one or more air cap holes 91 located thereupon, the atomization process using an air spray atomization process may be more efficiently achieved.

Nevertheless, in alternative embodiments, air 65 may be directed to both the exit air tubes 82 and through the set of exit air openings 66 as well as to the exit outer air tube 87 and to the fluid release cap 90 while the air spray atomization process occurs. In one or more non-limiting, exemplary embodiments, in order to selectively direct air to either exit air tubes 82 or exit outer air tube 87, one or more valves as known in the art may be used, including without limitation a solenoid valve. Alternatively, blocking plates (not shown) may be extended and retracted to cover air openings associated with exit air tubes 82 or exit air tube 87.

It is noted that in some embodiments, it may be possible for flowing air 65 to be selectively directed to a particular exit air tube 82 and thus to a particular group of a set of exit air openings 66. Accordingly, user 42 may selectively manipulate where any flowing air 65 may be directed to flow from top housing portion 38 and ultimately a set of exit air openings 66.

A method for assembling animal cleaning tool 20, supply hose 26, and fluid supply unit 34 may include coupling one end of supply hose 26 to an outlet (e.g., outlet 28) of fluid supply unit 34) and coupling the other end of supply hose 26 to an inlet (e.g. inlet 24) of animal cleaning tool 20. More specifically, in one or more embodiments, one end of air cleaning supply conduit 52 may be coupled to an opening end of air supply conduit 60 in top housing portion 38, and one end of cleaning agent supply conduit 54 may be coupled to an opening end of cleaning agent conduit 62 in top housing portion 38.

Figure 11:
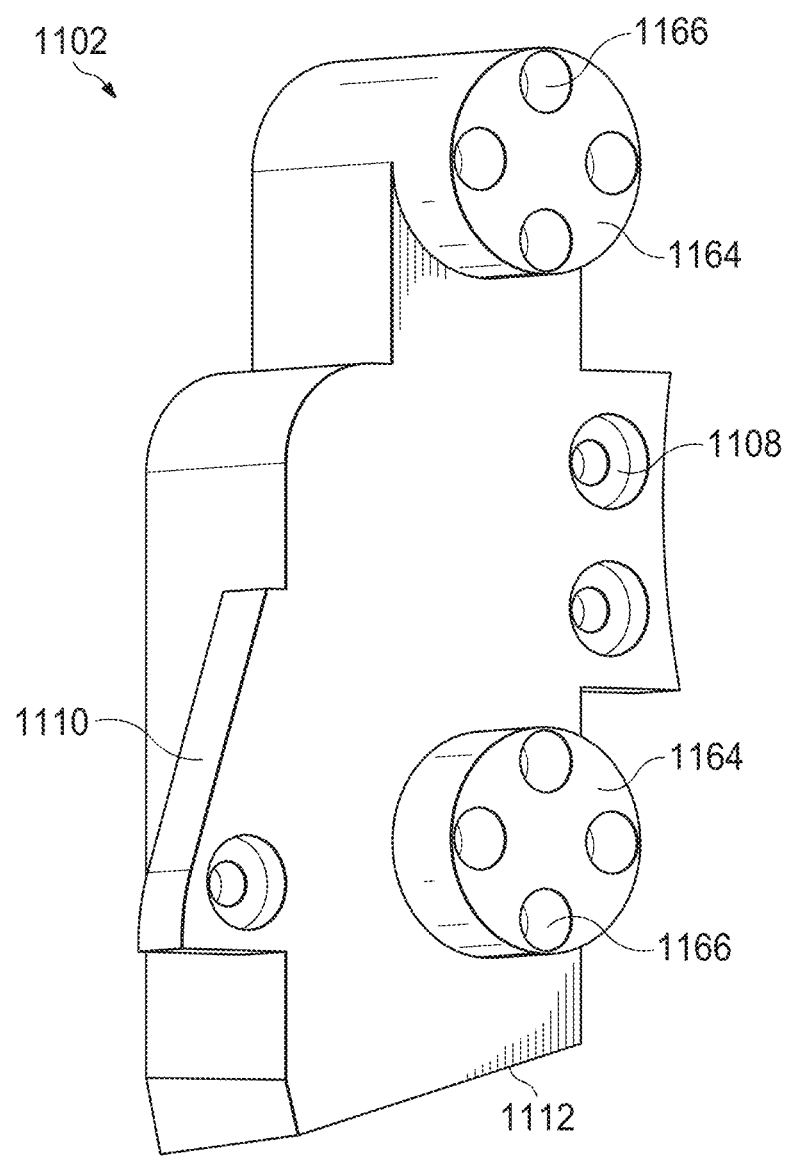
FIG. 11 shows a pictorial illustration of an insert for a top housing portion of the animal cleaning tool of FIG. 10.
Figure 12:
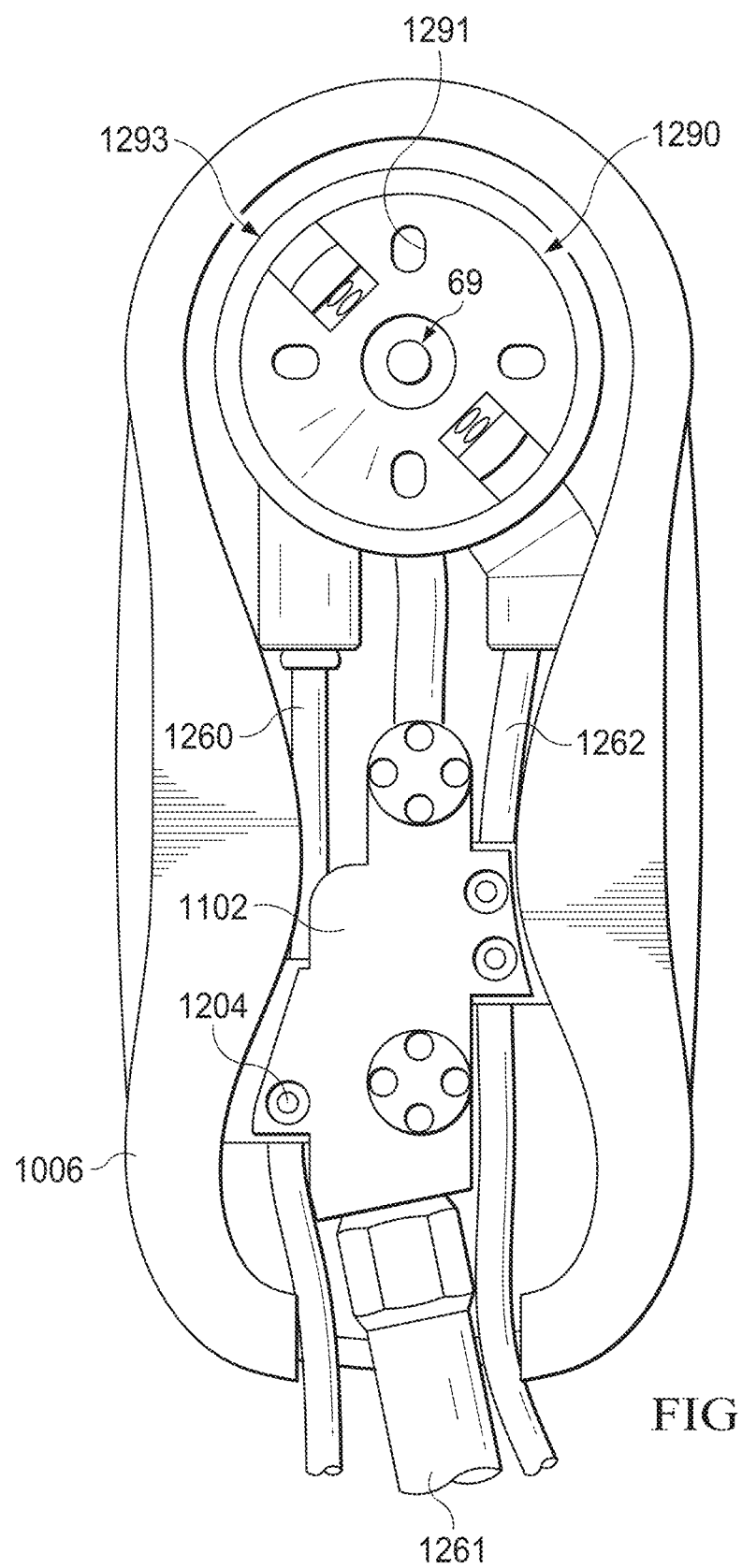
FIG. 12 shows a pictorial illustration of the top housing portion of the animal cleaning tool of FIG. 10 in accordance with one or more embodiments of the present disclosure.

Further, a base end 106 of nozzle 69 may be disposed in an end opening of cleaning agent conduit 60. In one or more embodiments, a fluid release cap 90 may be coupled to air supply conduit before bottom plate 64 is coupled to the top housing portion 38. Alternatively, fluid release cap 90 may be coupled after bottom plate 64 is coupled to top housing portion 38, whereby fluid release cap 90 is located through an outer opening in bottom plate designated for fluid release cap 90 to be fitted through. In one or more embodiments, as shown in FIG. 4, set of exit air openings 66 are arranged on bottom plate 64. Thus, in coupling bottom plate 64 to top housing portion 38, the set of exit air openings 66 become aligned with and in fluid communication with air supply conduit 60 (e.g. via exit air tubes 82). In one or more embodiments, and as shown in FIG. 6, exit air tubes 82 include at the end of air tubes 82 a set of exit air openings that correspond to and align with exit air openings 66 located on bottom plate 64. Alternatively, in other embodiments, exit air tubes 82 do not include a set of exit air openings, but rather exit air tubes 82 have an end opening or aperture through which air 65 may flow to the set of exit air openings 66 located on bottom plate 64. In other embodiments, (e.g., as shown in FIG. 10-12, and as further described below), an insert 1102 may be located within an internal cavity 1058 of a top housing portion of an animal cleaning tool (such as animal cleaning tool 1020), whereby the insert 1102 includes a set of exit air openings similar to exit air openings 66 described with respect to FIG. 4.

In one or more embodiments, a user, such as user 42 may couple supply hose 26 to fluid supply unit 34 and to animal cleaning tool 20, and user 42 may couple top housing portion 38 to bottom plate 64. Alternatively, in other embodiments, user 42 obtains animal cleaning tool 20, supply hose 26, and fluid supply unit 32 as a preassembled set.

It is noted that although it may be beneficial to reduce the amount of liquid or water disposed on animal 10's surface, it may be possible that one or more owners has a need to rinse or bathe animal 10 with water. Accordingly, in one or more embodiments, animal cleaning tool 20 may be coupled to a water source (not shown). In one or more embodiments, water source (not shown) may include without limitation a storage container (e.g., a bucket) holding some volume of water. In other embodiments, animal cleaning tool 20 may be coupled to a dispensation end of a faucet or hose, including one or more faucets and hoses found at residential or commercial residences. Alternatively, animal cleaning tool 20 may be connected to another water distribution system. In one or more embodiments, a supply hose, such as supply hose 26 may be coupled to the water source. In one or more embodiments, an adapter may be used to couple supply hose 26 to one end of the water source and the other end of supply hose 26 may be coupled to animal cleaning tool 20 through a connector and inserted through an inlet, e.g. inlet 24.

In one or more embodiments, when coupled to a water source, a selector or activation mechanism (e.g., selector 21 or activation mechanism 22, disposed on an outer surface of top housing portion 38 of animal cleaning tool 20 may be selected to trigger channeling of the water through the cleaning agent supply conduit 54. Subsequently, the water channeled from the water source may be released from the dispensing end 108 of the nozzle 69 onto a surface of animal 10. Thus, the animal cleaning tool 20 is versatile and may be utilized to connect to a water source to rinse or soak a surface of animal 10 if a user or owner so desires. It may then be feasible to dry and/or clean animal 10 using one or more methods described above for coupling supply hose 26 to a fluid supply unit, such as fluid supply unit 34, and subsequently activating a release of air 65 from fluid supply unit 34 to dry animal 10's surface using animal cleaning tool 20. Additionally, a user may engage a cleaning agent activation mechanism (e.g., activation mechanism 22) for releasing cleaning agent 50 as an atomized spray 104 of particles onto animal 10's surface.

Accordingly, FIG. 1-FIG. 6 may show exemplary, non-limiting embodiments of a cleaning tool 20 that may be coupled to a fluid supply unit 34, which is configured to include an air supply source 56 and a cleaning agent reservoir 32. It is noted that in other embodiments, fluid supply unit 34 may be alternatively replaced with a non-portable unit with similar functions, as shown in FIG. 7. FIG. 7 shows a pictorial illustration of an exemplary non-portable fluid supply unit and animal cleaning tool in accordance with one or more embodiments of the present disclosure. Fluid supply unit 734 functions the same as fluid supply unit 34 described above. Accordingly, fluid supply unit 734 includes an air supply source (not shown) and a cleaning agent supply source not shown). One or more selectors 706 may be selected by a user to dispense air, a cleaning agent such as cleaning agent 50 as described above (e.g. shampoo), or a combination thereof. Further, in one or more non-limiting, exemplary embodiments, payment device 708 may be included with fluid supply unit 734 which is configured to receive payment of any sort from a user, including without limitation, cash, coins, and/or credit cards. Alternatively, fluid supply unit 734 may not include a payment device.

In one or more embodiment, fluid supply unit 734 may be mounted or fixed to a support structure 704 via one or more mounting devices 712. Support structure 704 may be any type of support structure. As shown in an exemplary, non-limiting embodiment, support structure 704 may be a wall. Alternatively, support structure 704 may be any type of supporting structure or level, including furniture pieces, poles, columns, a floor or ground surface, or any other type of support structure. In one or more embodiments, mounting devices 712 may be fasteners of any type known in the art. Alternatively, fluid supply unit 734 may be attached to a support structure 704 through other means, such as welding or adhesives to name a few without limitation. In one or more embodiments, fluid supply unit 734 may be a free-standing unit that is not fixed or attached to support structure 704, but rather, the weight of fluid supply unit 734 may be heavy enough to prevent fluid supply unit 734 from being portable.

In one or more embodiments, a supply hose 726 may be coupled to fluid supply unit 734, and may be of any length or size. Supply hose 726 may function the same as supply hose 26 as described above. In one or more embodiments, supply hose 726 may channel flowing air and cleaning agent, such as air 65 and cleaning agent 50 as described above, to an animal cleaning tool 720. Animal cleaning tool 720 may function the same as animal cleaning tool 20 as described above in the present disclosure. In one or more embodiments, animal cleaning tool 720 may include a top housing portion 738 and a bottom plate 764 having a set of brushing elements 740 for brushing and cleaning an outer surface of an animal, such as animal 710. A user may select cleaning agent be emitted from fluid supply unit 734, and in one or more embodiments, cleaning agent from fluid supply unit 734 may be emitted onto a surface of animal 710 as an atomized spray of particles. Any process of atomization may be used as known in the art. In one or more embodiments, animal cleaning tool 720 may include a fluid release cap (e.g., fluid release cap 90) which may be configured to atomize cleaning agent through a substantially simultaneous release of air as cleaning agent is emitted from the fluid release cap.

While fluid supply unit 34 may be portable and may be readily transportable to one or more locations as convenient to a user, fluid supply unit 734 may be a non-portable unit used to clean an animal, such as animal 10. Fluid supply unit 734 may be installed at a number of facilities including veterinarian clinics, car washes, and animal spas or washing centers, as well as in various other locations without limitation.

FIG. 8 is a pictorial illustration of an animal cleaning tool 20 in accordance with one or more embodiments of the present disclosure. FIG. 9 is a bottom perspective view of the animal cleaning tool 20 of FIG. 8. In one or more embodiments, the animal cleaning tool 20 shown in FIGS. 8-9 may be used as described above with respect to animal cleaning tool 20 in FIGS. 1-6. Further, animal cleaning tool 720 shown in FIG. 7 may be implemented as animal cleaning tool 20. Thus, animal cleaning tool 20 in FIGS. 8-9 is another illustrative embodiment of animal cleaning tool 10 provided above, and may be assembled and implemented using any of the components and processes described above.

In one or more embodiments, animal cleaning tool 20 in FIG. 8-9 includes an activation mechanism 22 located on a top outer surface of top housing portion 38. In some embodiments, activation mechanism 22 may be used to selectively release cleaning agent 50 as a continuous stream. Further, in one or more embodiments, activation mechanism 22 may be switched to different positions (e.g., left, right, top) to release different fluids (e.g., air 65 or cleaning agent 50) as well as to turn on/off an attached fluid supply unit 34 or fluid supply unit 734. It is noted that activation mechanism 22 for animal cleaning tool 20 and additional selectors, such as selector 21, may be located anywhere as desired or as suitable on either top housing portion 38 or bottom plate 64, and are not limited to the placement shown in any of the Figures in the present description.

In one or more embodiments, animal cleaning 20 as shown in FIGS. 8-9 includes a set of brushing elements 40 that may be used to brush a surface of an animal, such as animal 10. The set of brushing elements 40 may brush cleaning agent 50 into and out of a surface of an animal 10. Further, the set of brushing elements 40 may be used to brush a hair or coat of animal 10 to remove unwanted ticks and/or fleas or de-shed an animal. The protruding ends of the set of brushing elements 40 may accomplish this when a user grasps animal cleaning tool 20 in his or her hands and proceeds to contact a surface of an animal and move the animal cleaning tool 20 over the surface of an animal.

As shown in FIGS. 8-9, the animal cleaning tool 20 may include a curved pair of sidewalls 74. In one or more embodiments, it may be easier to hold or grasp animal cleaning tool 10 in the palm of a user's head having the curved pair of sidewalls 74. Nevertheless, there is no limitation as to the shape or curvature of either the sidewalls 74 or animal cleaning tool 20 in the present disclosure.

As shown in FIG. 8-9, bottom plate 64 may be coupled to a top housing portion 38. Bottom plate 64 may be removable and exchangeable with alternative bottom plates 64 having other arrangements of the set of brushing elements 40 or other air openings 66. In one or more embodiments, bottom plate 64 may include a fluid release cap 90. As shown in FIG. 9, a dispensing end 108 of a nozzle (e.g., nozzle 69) as described above may extend through an aperture (e.g., aperture 89) of fluid release cap 90. Further, fluid release cap 90 in FIG. 9 may include a set of air cap holes 91 and air cap members 93 as described above. FIG. 9 further illustrates inlet 24 to animal cleaning tool 20 through which supply hose 26 may be extended to access an interior cavity 58 (not shown) of animal cleaning tool 20.

Turning to FIGS. 10-12, an embodiment of a top housing portion 1038 of animal cleaning tool 1020 is provided that utilizes an insert for locating a set of brushing elements 1066 between the top housing portion 38 of animal cleaning tool 20 and bottom plate 64. In one or more embodiments, animal cleaning tool 1020 may function as an animal cleaning tool 20 described above and may include similar features and/or elements. Further, animal cleaning tool 1020 may be coupled to a supply hose, such as supply hose 26, which may be connected to a fluid supply unit 34 as described above.

Top housing portion 1038 as shown in FIG. 10 may include a receptacle 1002 that may be configured to be coupled to a fluid release cap (e.g. fluid release cap 90). Receptacle 1002 may include a nozzle aperture 1004, whereby a base end of a nozzle (e.g. base end 106 of nozzle 69) may be fit into the nozzle aperture 1004. Animal cleaning tool 1020 as shown in FIG. 10 may further include an interior cavity 1058 within which receptacle 1002 may be disposed. In one or more embodiments, one or more interior edges 1006 of top housing portion 1038 may curve inwardly. Further, one or more insert connecting members 1010 may be included, whereby insert connecting members 1010 may be used to connect to insert 1102 (shown in FIG. 11). Inlet 1022 may be an inlet for inserting a supply hose, such as supply hose 26 discussed above. In one or more embodiments, a bottom plate, such as bottom plate 64 shown in FIG. 8-9 may be coupled to top housing portion 1038, having a set of brushing elements 40.

FIG. 11 shows a non-limiting, exemplary embodiment of an insert 1102 that may be inserted into top housing portion 1038 of animal cleaning tool 1020. Insert members 1110 shown in FIG. 11 may be located onto connecting members 1010 as shown in FIG. 10. One or more fasteners (e.g., fasteners 1204 in FIG. 12) may be inserted in fastener holes 1108 to affix insert 1102 in place.

A set of exit air openings 1166 may be located and arranged on insert support surfaces 1164. A set of exit air openings 1166 may be the same in form and function as the set of exit air openings 66 as described above with respect to FIGS. 1-9. Accordingly, a set of exit air openings 1166 may be one or more groups of holes through which air may be emitted. Air may be supplied through one or more conduits, and originate from a fluid supply unit, such as fluid supply unit 34 described above. A set of exit air openings 1166 may be formed having any diameter, size and may be arranged in any number of holes or pattern as desired.

Insert 1102 may include two main openings (not shown) that extend through a lower underside portion 1112 of insert 1102. Through these lower two main openings, air supply conduits and cleaning agent supply conduits, such as those described above with respect to air supply conduit 60 and cleaning agent supply conduit 62 may extend through and connect to one or more connector conduits 1012, which feed into receptacle 1002. In one or more embodiments, receptacle 1002 may include one or more openings whereby air from an air supply conduit may be released through the one or more openings of receptacle 1002.

FIG. 12 is a pictorial illustration of a few elements of animal cleaning tool 1020 assembled in place. As shown in FIG. 12, fluid release cap 1290 is coupled to receptacle 1002. In one or more embodiments, fluid release cap 1290 may be configured as fluid release cap 90 as described above with respect to FIG. 1, FIG. 3, and throughout the present description. Fluid release cap 90 may include air cap holes 1291 and air cap members 1293, which operate as described above with respect to fluid release cap 90 during an air spray atomization process.

As shown in FIG. 12, an air supply conduit 1260 may connect through a first lower opening on one lateral side of insert 1102 and out through an upper opening of insert 1102 and then proceed to connect through connector conduit 1012 into receptacle 1002 (not shown in FIG. 12). A cleaning agent conduit 1262 may connect through a second lower opening located on an opposite lateral side of insert 1102 and out through an upper opening of insert 1102 and then proceed to connect through connector conduit 1012 into receptacle 1002. Thus, air supply conduit 1260 and cleaning agent conduit 1262 extend along a longitudinal axis through an interior of insert 1102.

In one or more embodiments, a conduit 1261 may be particularly directed to set of exit air openings 1166 as disposed on insert 1:102. As shown in FIG. 12, insert 1102 may be detached front receptacle 1002. Alternatively, in one or more embodiments, insert 1102 may be attached to receptacle 1002.

Thus, FIGS. 10-12 provide an alternative embodiment for an animal cleaning tool such as animal cleaning tool 20. Animal cleaning tool 1020 may be used to clean and maintain the hygiene of an animal, such as animal 10, using one or more processes described above and throughout the present disclosure. A bottom plate, such as bottom plate 64 described above in FIG. 1-9, may be coupled to a bottom surface of top housing portion 1038 of animal cleaning tool 1020. In one or more embodiments, when bottom plate 64 is coupled to top housing portion 1038, animal cleaning tool 1020 may be used to brush animal 10, and upon activation thereof, air 65 from fluid supply unit 34 may be directed through one or more conduits of animal cleaning tool 1020 (e.g. air supply conduit 1260) and cleaning agent 50 may be directed from fluid supply unit 34 via a supply hose such as supply hose 26 to cleaning agent conduit 1262.

In animal cleaning tool 1020, insert 1102 is included, whereby insert 1102 includes a set of exit air openings 1166. Further, air supply conduit 1261 and cleaning agent conduit 1262 are extended through a body of insert 1102 and connect to a receptacle, such as receptacle 1002 located in an interior cavity 1058 of top housing portion 1038.

In addition to the above, electrical wiring, including insulated electrical wiring (not shown in FIG. 10-12) may be included in animal cleaning tool 1020 in order to connect to a fluid supply unit 34, including an air supply source and cleaning agent source, such that animal cleaning tool 1020 may be in signal communication with a fluid supply unit, such as fluid supply unit 34. Further, electrical wiring may be connected from animal cleaning tool 1020 to an electrical power source for use in conjunction with one or more selectors, e.g. selector 21, or activation mechanism, e.g. activation mechanism 22 that may be located on an outer housing of animal cleaning tool 1020.

Figure 13:
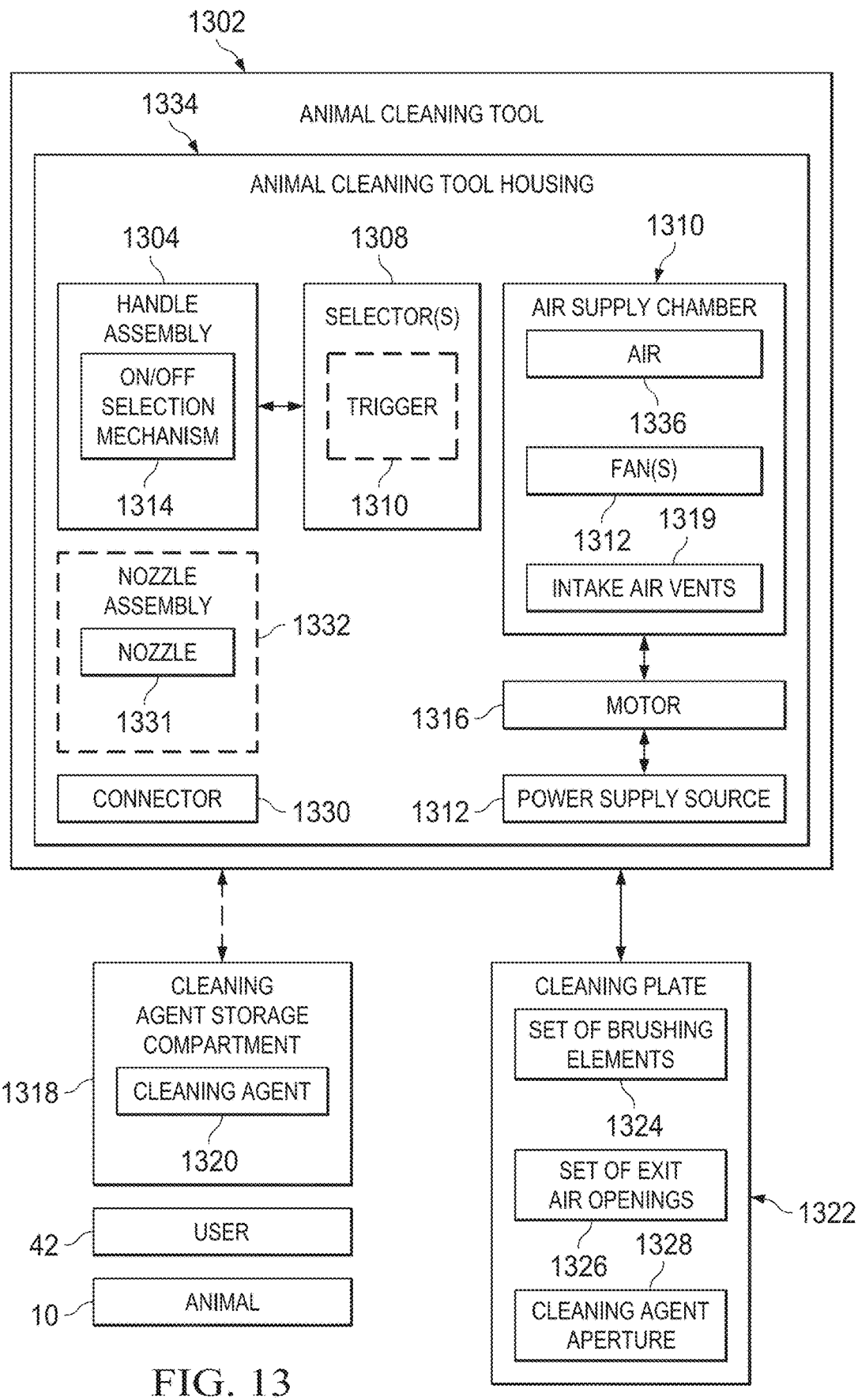
FIG. 13 shows a block diagram of an alternative animal cleaning tool in accordance with one or more embodiments of the present disclosure.
Figure 14:
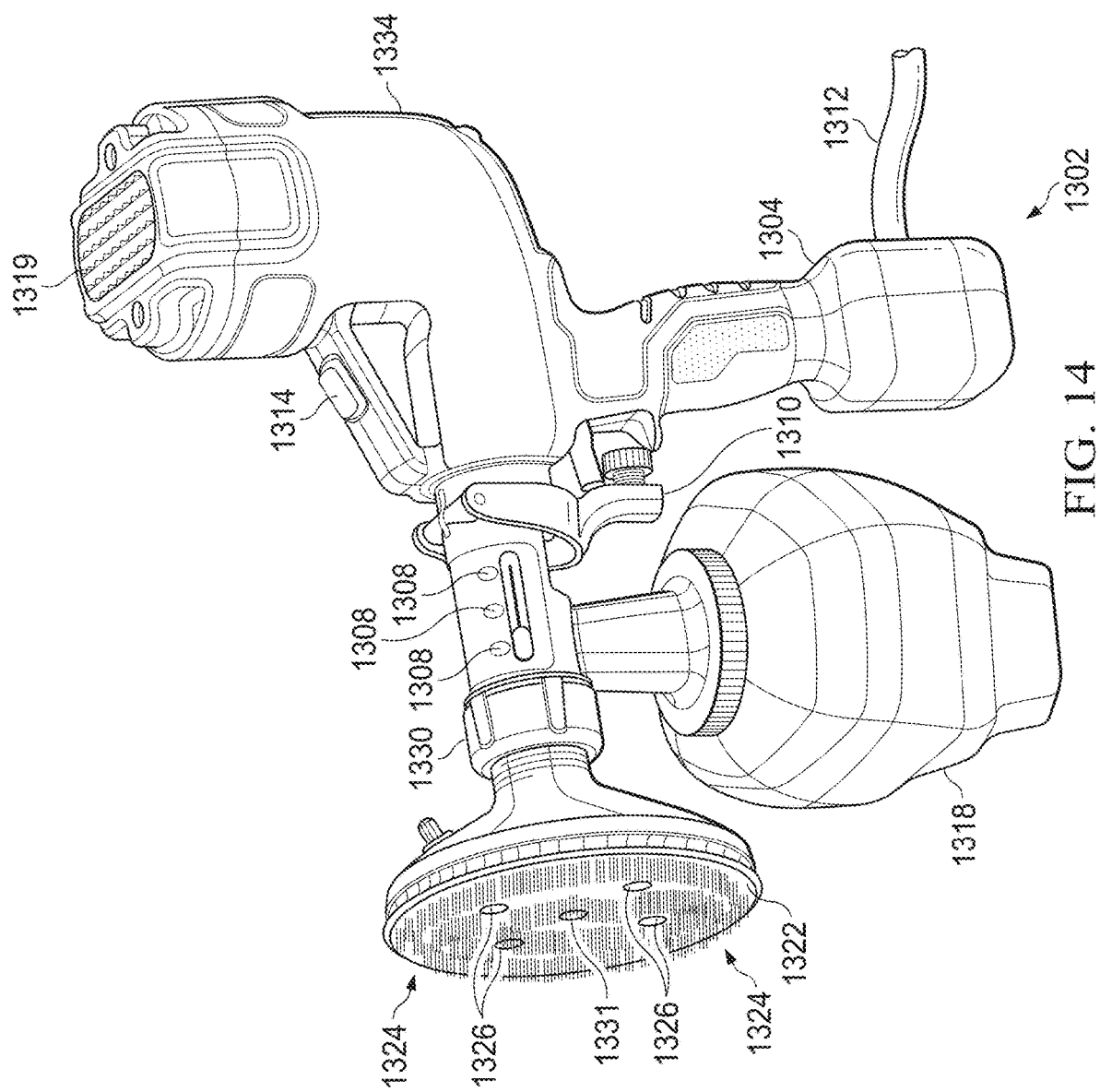
FIG. 14 shows a pictorial illustration of the animal cleaning tool of FIG. 13 in accordance with one or more embodiments of the present disclosure.

Turning to FIG. 13, FIG. 13 shows a block diagram of an animal cleaning tool in accordance with one or more embodiments of the present disclosure. FIG. 14 shows a pictorial exemplary, non-limiting, illustrative embodiment of an animal cleaning tool, such as animal cleaning tool 1302 described below with respect to FIG. 13. It is noted that one of ordinary skill in the art may appreciate that other configurations for animal cleaning tool 1302 may be provided and are in keeping with the present disclosure.

Animal cleaning tool 1302 may be used to clean and maintain the hygiene of an animal, such as animal 10, as described above, in accordance with one or more methods described herein. A user, such as user 42, may be an owner of animal 10 in one or more embodiments. Alternatively, user 42 may be employed to clean animals such as those found at veterinarian offices, pet salons, and the like. Animal 10 may be any type of animal, including a household pet of a pet owner or user of animal cleaning tool 10.

In one or more embodiments, animal cleaning tool 1302 may include a housing 1334. Housing 1334 may serve as an enclosure for one or more internal components and assembly pieces of animal cleaning tool 1302. Housing 1334 may further include an outer surface having one or more selectors 1308. Selectors 1308 may be any type of selectors known to those of ordinary skill in the art, including without limitation, buttons, knobs, triggers, or dials. Selectors 1308 may be disposed on an outer surface of housing 1334 to provide user 42 with means to select one or more options or features of animal cleaning tool 1302.

Further, in one or more embodiments, a trigger, such as trigger 1310 may be selectively depressed or released by a user to select dispensing of air, such as air 1336 and/or cleaning agent, such as cleaning agent 1320.

In one or more embodiments, a handle assembly, such as handle assembly 1304 may be included with animal cleaning tool 1302. Thus, a handle assembly 1304 may provide a user, such as user 42 with a location for gripping animal cleaning tool 1301. In other embodiments, user 42 may be enabled to grip any surface of the animal cleaning tool 1302 irrespective of an included handle assembly. It is noted that animal cleaning tool 1302 may be of any shape or size as desired. Likewise, handle assembly 1304 may be of any shape or size suitable to its application.

In one or more embodiments, an on/off selection mechanism 1314 may be disposed on a surface of animal cleaning tool housing 1334. Such an on/off selection mechanism 1314 may be used to activate power to animal cleaning tool 1302. In one or more embodiments, animal cleaning tool 1302 may further include a power supply source 1312. In one or more embodiments, power supply source 1312 may supply an electric current to animal cleaning tool 1302, e.g. from an electrical outlet. In other embodiments, power supply source may be powered by one or more batteries disposed within animal cleaning tool 1302.

In one or more embodiments, animal cleaning tool 1302 may include one or more motors 1316 (e.g., speed-controlled motors), which may be coupled to power supply source 1312. Further, air supply chamber 1310 may be disposed in animal cleaning tool 1302. Air supply chamber 1310 may be adapted to circulate and direct a release of air, such as air 1336 to one or more exit air openings (e.g., exit air openings 1326 of cleaning plate 1322). In one or more embodiments, air supply chamber 1310 may include a set of intake air vents 1314. Further, air supply chamber 1310 may include one or more fans 1312 for distributing air 1334. Those of ordinary skill in the art will appreciate that additional components may be necessary to the operation of air supply chamber 1310, motor 1316, and fans 1312.

In one or more embodiments, a cleaning agent storage compartment 1318 may be included with animal cleaning tool 1302. In one or more embodiments, cleaning agent storage compartment 1318 may be adapted to act as a receptacle for containing or storing cleaning agent 1320. Cleaning agent 1320 may be a cleaning product that is particularly suited for cleaning an animal, such as animal 10. In one or more embodiments, cleaning product has a reduced amount of water, such as without limitation, including less than 70 percent of water as an ingredient of cleaning agent 1320. Cleaning agent 1320 may include the same properties and characteristics described above with respect to cleaning agent 50 as discussed throughout the present disclosure.

In one or more embodiments, cleaning agent storage compartment 1318 may be coupled to any side of a housing 1334 of animal cleaning tool 1302 (e.g., 1302 as shown in FIG. 14). In FIG. 14, the cleaning agent storage compartment 1318 is disposed below the cleaning plate 1322. However, in other embodiments, cleaning agent storage compartment 1318 may be disposed above the cleaning plate 1322. In one or more embodiments, cleaning agent storage compartment 1318 may be removeably coupled to animal cleaning tool housing 1334.

Alternatively, in other embodiments, cleaning agent storage compartment 1318 may be enclosed within an outer housing 1334 of animal cleaning tool 1302 rather than being coupled to the housing 1334 of animal cleaning tool 1302.

Accordingly, in one or more embodiments, cleaning plate 1322 may be removeably coupled to animal cleaning tool 1302. In some embodiments, a connector, such as connector 1330 (e.g., shown in FIG. 14) may be used to coupled cleaning plate 1322 to and from animal cleaning tool 1302. Cleaning plate 1322 may include a set of brushing elements 1324. A set of brushing elements 1324, in accordance with one or more embodiments, may be interchangeably described as brushing bristles. A set of brushing elements 1324 may be of any size or shape and may be made of any material, including animal or human hair, polyester, rubber, or plastic, without limitation. While the set of brushing elements 1324 in FIG. 10 are shown in an exemplary, non-limiting embodiment as short hair-like bristles, the set of brushing elements 1324 may include any other shape, size, configuration, or material known in the art for forming brushing bristles, including conical or spherical shaped brushing elements.

According to embodiments of the present disclosure, cleaning plate 1322 may further include a set of exit air openings 1326, which may be configured to release flowing air 1334. Further, cleaning plate 1322 may further include at least one cleaning agent aperture 1328. In one or more embodiments, cleaning agent aperture 1328 may be configured to dispense cleaning agent 1320.

In one or more embodiments, a nozzle assembly 1332 (not shown in FIG. 14) may be included with an interior structure of animal cleaning tool 1302. One or more nozzles 1331 (not shown) may be incorporated within such an interior structure and may be used to dispense cleaning agent 1320 from cleaning agent storage compartment 1318.

Figure 15:
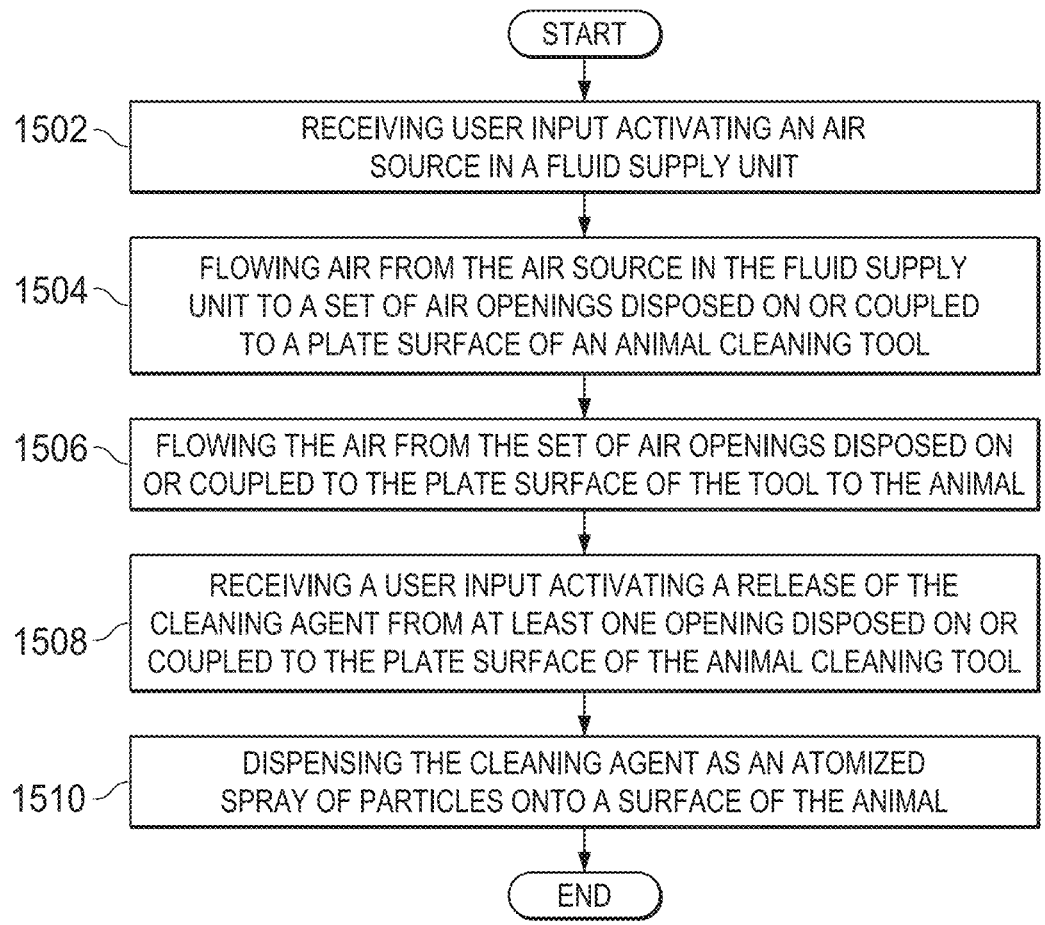
FIG. 15 is a flow chart of a process for using an animal cleaning tool in accordance with one or more embodiments of the present disclosure.

FIG. 15 shows a flow chart of a method of using an animal cleaning tool in accordance with one or more embodiments. The process provided in FIG. 15 may be implemented by an animal cleaning tool and fluid supply unit, such as animal cleaning tool 20 and fluid supply unit 34 provided in FIGS. 1-6 and FIG. 8-9. Further, the process provided in FIG. 15 may be implemented by animal cleaning tool 720 and fluid supply unit 734 in FIG. 7. Further, the process provided in FIG. 15 may be implemented using animal cleaning tool 1020 in FIG. 10-12, as well as animal cleaning tool 1302 in FIG. 13.

The process may begin by receiving user input activating an air source in a fluid supply unit (step 1502). The process may continue by flowing air from the air source in the fluid supply unit to a set of air openings disposed on or coupled to a plate surface of an animal cleaning tool (step 1504). In one or more embodiments, the process may continue by flowing the air from the set of air openings disposed on or coupled to the plate surface of the animal cleaning tool to the surface of the animal (step 1506). Subsequently, the process may receive a user input activating a release of the cleaning agent from at least one opening disposed on or coupled to the plate surface of the animal cleaning tool (step 1508). Upon activating the release of the cleaning agent, the cleaning agent may be dispensed as an atomized spray of particles onto a surface of the animal (step 1510).

In some alternative implementations, the functions noted in the steps of the flowchart shown in FIG. 15 may occur out of the order noted in FIG. 15. For example, two steps shown in succession may, in fact, be executed substantially concurrently, or the steps may sometimes be executed in the reverse order, depending upon the functionality involved.

Figure 16:
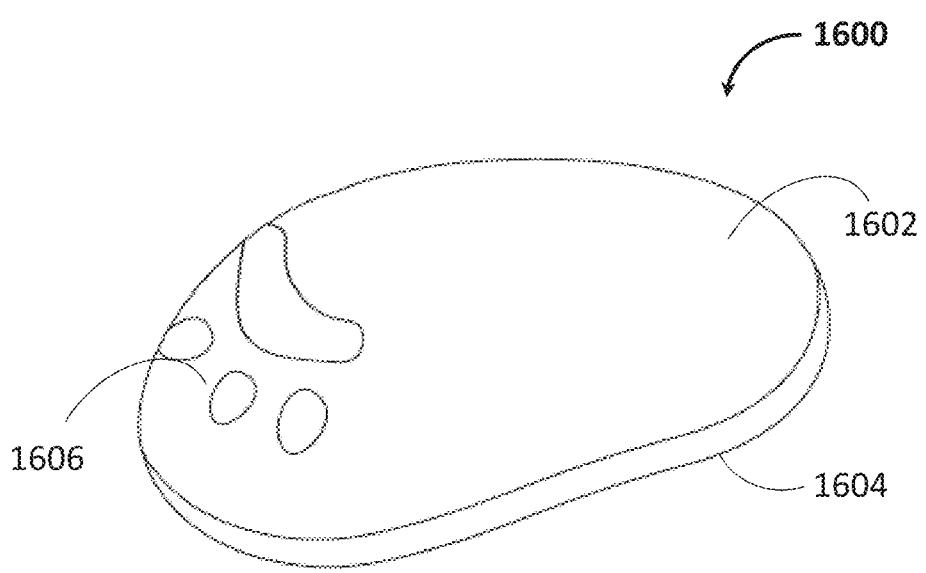
FIG. 16 shows an animal cleaning device in accordance with one or more embodiments of the present disclosure.

Turning to FIG. 16, FIG. 16 shows an embodiment animal cleaning tool (1600) in accordance with one or more embodiments of the invention. As shown in FIG. 16, the animal cleaning tool (1600) includes a top portion (1602) and a bottom portion (1604). The top portion (1602) may include a number of actuators (1606). Each of these components is discussed below.

In one or more embodiments of the invention, the animal cleaning tool (1600), though not shown in FIG. 16, is coupled to a fluid supply unit (e.g., fluid supply unit (34) of FIG. 1; fluid supply unit (734) of FIG. 7) via one or more conduits (e.g., air supply conduit (52) and cleaning agent supply conduit (59) of FIG. 1). The conduits (not shown) may supply fluids, such as the aforementioned air and cleaning agent, to the animal cleaning tool (1600). Additionally or alternatively, one or more conduits may include functionality to draw fluids and/or other material away from the animal cleaning tool (1600) and to the fluid supply unit. For example, the animal cleaning tool (1600) may include a vacuum feature (not shown, discussed further below in the discussion of a suction vent in FIG. 17) for removing hair, debris, particles, other fluids, mud, dirt, sand, organisms, etc. from the surface of an animal, which may then be drawn through a conduit to the fluid supply unit by a vacuum source device (not shown).

In one or more embodiments of the invention, a vacuum source device is any device that includes functionality to creating a suction effect in order to create a partial vacuum capable of removing fluids and/or other items (e.g., hair) from a surface (e.g., a surface of an animal). In one or more embodiments of the invention, any fluids of other items (e.g., hair, sand, etc.) drawn to a fluid supply unit by a vacuum supply source may be collected in a vacuum repository (not shown). In one or more embodiments of the invention, a vacuum repository is any receptacle for the collection of anything that is taken into an animal cleaning device (1600), through a conduit, and towards a fluid supply unit by way of suction created by a vacuum supply source. In one or more embodiments of the invention, a vacuum repository is included in or coupled to the fluid supply unit. In one or more embodiments of the invention, the vacuum repository may be removed (e.g., by a user) in order to be emptied before being reattached.

In one or more embodiments of the invention, the animal cleaning tool (1600) includes functionality to, at least in part, facilitate the grooming of an animal. As used herein, the term 'groom' and/or 'grooming' is intended to incorporate any aspect of animal grooming, including animal cleaning.

In one or more embodiments of the invention, the top portion (1602), as discussed above in reference to top housing portion 38 of FIG. 1 and FIG. 2, may be any shape. For example, the top portion (1602) may be a shape that includes curved sides that facilitate a user (not shown) to hold the animal cleaning tool (1600) while cleaning an animal. For example, the animal cleaning tool (1600) may have a shape generally similar to that of a device (e.g., a 'mouse') for manipulating a cursor within a graphical user interface of a display screen operatively connected to a computing device. In one or more embodiments of the invention, the top portion (1602), as discussed above, may be constructed of any material or combination of materials.

In one or more embodiments of the invention, the top portion (1602) includes one or more actuators (1606). As discussed above in the descriptions of selectors (21) and activation mechanisms (22) of FIG. 1, actuators (1606) may be located anywhere on the top portion (1602) of the animal cleaning device (1600), and may include any one or more types of actuators, including, but not limited to, a button, a dial, a knob, a switch, a trigger, a release, touchpad, any other electrical and/or mechanical element, and/or any combination thereof. In one or more embodiments of the invention, the actuators (1606), individually and/or in combination, include functionality to cause an action of the animal cleaning tool (1600) to occur. For example, each individual actuator may cause a specific action, or a group of actuators may be necessary to cause a certain action. Examples of such actions include, but are not limited to, blowing air from the animal cleaning tool, intaking (e.g., vacuuming) air and/or other material into the animal cleaning tool, outputting a cleaning agent (e.g., shampoo, soap, etc.) and/or other fluid (e.g., water), and/or causing all or any portion of the brushing elements (discussed further below in the description of FIG. 17) to rotate.

In one or more embodiments of the invention, the animal cleaning device (1600) also includes a bottom portion (1604), which may include all or any portion of the aspects and/or features of bottom plate 64 as described above and as shown in FIG. 1, FIG. 2, FIG. 4, FIG. 5, FIG. 8, and FIG. 9. In one or more embodiments of the invention, the bottom portion (1604), as discussed above in relation to bottom plate (64), may be constructed using any material or combination of materials, and may be affixed in any manner, removeably or non-removeably, to the top portion (1602). The bottom portion (1604) is discussed further in the description of FIG. 17, below.

Figure 17:
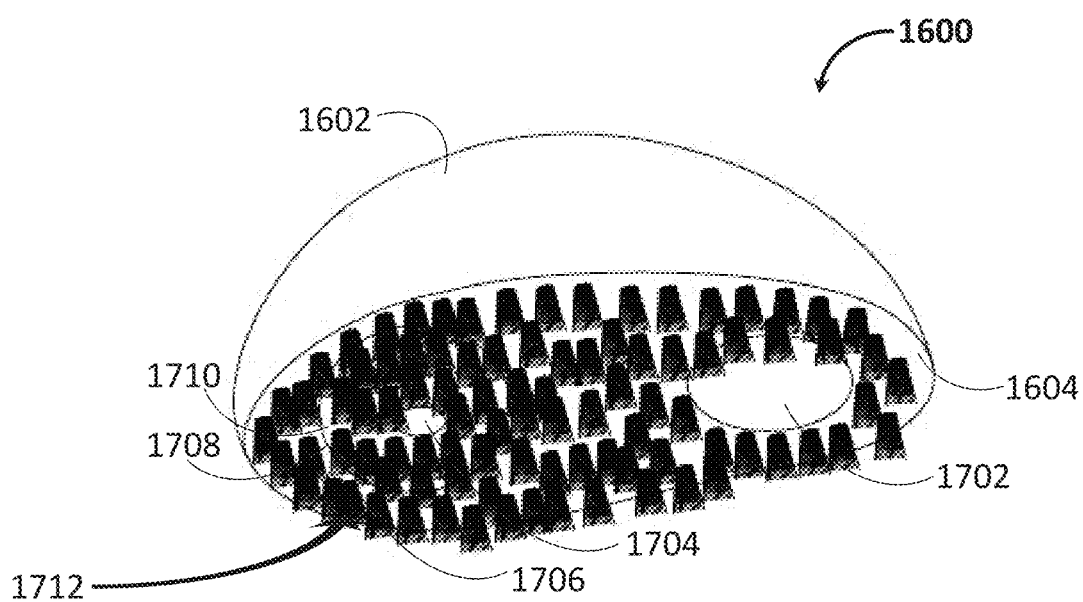
FIG. 17 shows an animal cleaning device in accordance with one or more embodiments of the present disclosure.

Turning to FIG. 17, FIG. 17 shows a perspective view of an animal cleaning device (1600) having a top portion (1602) and a bottom portion (1604). In one or more embodiments of the invention, the animal cleaning device (1600) is substantially similar to the animal cleaning device (1600) shown in FIG. 16.

In one or more embodiments of the invention, the bottom portion (1604) includes one or more suction vents (1702). In one or more embodiments of the invention, a suction vent (1702) is an opening in the bottom portion (1604) of any shape, and includes functionality to suction air and/or incorporate a negative pressure. In one or more embodiments of the invention, the one or more suction vents (1702) may be located at any location on the bottom portion (1604). In one or more embodiments of the invention, the suctioning of air and/or creation of negative pressure allows the animal cleaning device (1600) is remove fluids and other items from the surface of an animal being cleaned. Examples of such fluids and other items include, but are not limited to, hair, cleaning agent residues, shampoo residues, water, bacteria, fleas, other organisms, mud, dirt, sand, debris, other particles, etc. In one or more embodiments of the invention, the suction vent (1702) is activated by one or more actuators (1606) shown in FIG. 16.

In one or more embodiments of the invention, the bottom portion (1604) includes one or more blow vents (1704). In one or more embodiments of the invention, a blow vent (1704) is an opening in the bottom portion (1604) of any shape, and includes functionality to blow air out of the animal cleaning device (1600). In one or more embodiments of the invention, the one or more blow vents (1704) may be located at any location on the bottom portion (1604). In one or more embodiments of the invention, the blowing of air allows the animal cleaning device (1600) to blow fluids (e.g., water) and/or other items (e.g., hair) from the surface of an animal. In one or more embodiments of the invention, the blow vent (1704) is activated by one or more actuators (1606) shown in FIG. 16.

In one or more embodiments of the invention, the bottom portion (1604) includes one or more heated airflow vents (1706). In one or more embodiments of the invention, a heated airflow vent (1706) is an opening in the bottom portion (1604) of any shape, and includes functionality to blow heated air out of the animal cleaning device (1600). In one or more embodiments of the invention, the one or more heated airflow vents (1706) may be located at any location on the bottom portion (1604). In one or more embodiments of the invention, one or more of the heated airflow vents (1706) may also be one or more of the blow vents (1704). In such embodiments, the heating if air, or lack thereof, as well as the temperature of the heated air, is activated by one or more actuators (1606) shown in FIG. 16. In other embodiments of the invention, the one or more blow vents (1704) and one or more heated airflow vents (1706) are separate openings in the bottom portion (1604). In one or more embodiments of the invention, the heated airflow vents (1706) are configured to blow heated air onto the surface of an animal, which may, for example, allow the animal cleaning device (1600) to dry wet hair and/or the outer surface of an animal.

In one or more embodiments of the invention, the bottom portion (1604) includes any number of affixed brushing elements (1712), which may be substantially similar to brushing elements (40) as described above. As such, each brushing element (1712) may include any number of bristles. In one or more embodiments of the invention, the one or more brushing elements (1712) may be located at any location on the bottom portion (1604).

In one or more embodiments of the invention, the bottom portion (1604) includes one or more rotating brushes (1708). In one or more embodiments of the invention, a rotating brush includes a portion of the brushing elements (1712) affixed to the bottom portion (1604). In one or more embodiments of the invention, a rotating brush (1708) is any shape (e.g., substantially circular), and may be located within any portion of the bottom portion (1604). In one or more embodiments of the invention, the rotating brush (1708) is configured to rotate in any direction (e.g., clockwise, counter clockwise). In one or more embodiments of the invention, the rotating brush (1708) is activated by one or more actuators (1606) shown in FIG. 16, which may also control the speed of rotation, direction of rotation and/or which rotating brushes rotate (e.g., in embodiments with more than one rotating brush). In one or more embodiments of the invention, while the one or more rotating brushes (1708) rotate, the remainder of the bottom portion (1604), and the brushing elements (1712) affixed thereto, may remain in a fixed position relative to the top portion.

In one or more embodiments of the invention, the bottom portion (1604) includes one or more formulation dispensers (1710). In one or more embodiments of the invention, a formulation dispenser (1710) is an opening of any shape that is located at any location on the bottom portion (1604), and includes functionality to dispense a formulation onto the surface of an animal. In one or more embodiments of the invention, the formulation is stored within the animal cleaning device (1600). In other embodiments of the invention, the formulation is provided to the animal cleaning device (1600) from a coupled fluid supply unit (not shown) (e.g., via one or more conduits). In one or more embodiments of the invention, the formulation may be a natural or chemical formulation, such as, for example, shampoo, conditioner, perfume, soap solution, etc.

In one or more embodiments of the invention, any of the suction vents (1702), blow vents (1704), heated airflow vents (1706), rotating brushes (1708), and formulation dispenser (1710) may be actuated (e.g., by one or more actuators (1606) shown in FIG. 16) individually, or in any combination of two or more. For example, a user (e.g., user 42 of FIG. 1) may use two actuators (1606) located on the top portion (1602) to actuate a blow vent (1704) and a formulation dispenser (1710) at substantially the same time. As another example, a user may use one actuator (1606) to only actuate a heated airflow vent (1706).

The one or more embodiments for an animal cleaning tool described above may provide a number of advantages and benefits, some of which are discussed below. One or more embodiments for the animal cleaning tool described herein may allow the animal owner to regularly clean, bathe, and maintain the hygiene of his or her animal in less time and with a greater degree of efficiency. It may be helpful and desirable to the animal owner that the same tool may be used according to one or more embodiments described herein to wash using a cleaning agent, brush, clean, and dry an animal. Thus, an animal may be cleaned and dried in a much shorter time period on the order of a number of minutes. Conventional methods for cleaning and drying an animal are much more time consuming and laborious. It is noted that because one or more embodiments of animal cleaning tools as described herein may encompass a number of steps that existing cleaning methods require be separately performed, it may be feasible to greatly reduce the time spent in washing, cleaning, and/or drying an animal thereafter.

Further, one or more embodiments of the present disclosure may incorporates using pressurized air with a cleaning agent that may atomize or deposit the cleaning agent as a fine spray of particles onto a surface of the animal. As disclosed herein, the pressurized air may be released at a range of preferred pressures and/or velocities. It may be a more soothing cleansing experience for the animal to have air blowing onto the surface of the animal as well as the cleaning agent to be distributed over the animal's coat, skin, or fur as a fine spray of particles, rather than the conventional methods of applying excessive amounts of water and soap which must be repeatedly applied and then removed from the animal. Thus, one or more embodiments described herein provide for a process of an improved cleansing and bathing process that an animal may find more pleasant and provides the animal owner or caretaker a much quicker, more efficient way to remove dirt, mud, and unwanted odors from an animal.

Another example of how various embodiments of the invention may cause a grooming process to be more pleasant for an animal relates to the use of a speed-controlled motor in one or more embodiments of the invention to provide power for one or more devices in a fluid supply unit and/or animal cleaning device. Specifically, as discussed above in the description of an electric motor, a speed-controlled motor, as used herein, refers to a motor whose rotational speed can, for example, be increased gradually, leading to a more gradual increase in the sound volume of an operating motor in one or more embodiments of the invention. Such volume control may cause an animal to be less frightened of the device while in operation, as it may allow the animal to gradually become accustomed to increasing levels of motor noise.

In addition, it is noted that the brushing elements (e.g., set of brushing elements 40) included with one or more embodiments of an animal cleaning tool described in the present disclosure may provide a number of benefits. For example, the brushing elements may be used to brush the cleaning agent throughout the various contours and parts of an animal, without requiring a human to physically make contact using one's hands with a dirty or unclean part of animal. Such cleaning may be enhanced, for example, by one or more rotating brushes.

The washing, cleansing, brushing, and drying processes described herein in accordance with one or more embodiments may provide the ability for the animal owner to maintain the hygiene of an animal more regularly. One or more embodiments of the animal cleaning tool may be adapted to do a high percentage of the work involved in cleaning, brushing, and drying of an animal, thus reducing the steps that a human user must perform. Since washing an animal is accomplished rapidly and easily, washing one's animal may become a more regular, routine, and less dreaded procedure when using an animal cleaning tool according to one or more embodiments described herein.

Further, the one or more embodiments of an animal cleaning tool described herein may reduce an amount of water used for washing, which may counteract the effects of washing and cleaning an animal because if too much water is left on a surface of an animal, the water begins to develop undesirable odors. As described herein, a cleaning agent may incorporate fragrances that may be applied to a surface of an animal and leave a more pleasant smell. Further, as described above, in one or more embodiments of an animal cleaning tool, cleaning agent solutions may incorporate chemicals or solutions that allow for flea, and tick control. In other embodiments, instead of dispensing a cleaning agent from an animal cleaning tool, a composition or solution for treating and controlling fleas and ticks may be dispensed from an animal cleaning tool and brushed into a surface of an animal.

Further, the one or more embodiments of the invention, as discussed above in the descriptions of FIG. 16 and FIG. 17, may include an animal cleaning device that includes one or more suction vents. A suction vent may allow the device to perform a vacuum function. For example, a vacuum source in a fluid supply base may be coupled by a conduit to a suction vent of the animal cleaning device in order to create a suction that draws fluids and/or other items (e.g., hair) from the surface of an animal and into a vacuum repository for disposal by a user. Such a vacuum feature may provide a variety of advantages. Such advantages include, but are not limited to: the ability to use stronger and/or heavier cleaning solutions (e.g., formulations) due to the ability to vacuum such solutions from the surface of an animal; the ability to vacuum other items such as bacteria, fleas, other organisms, mud, dirt, sand, debris, and/or any other particles from the surface of an animal; and the ability to vacuum hair from the surface of the animal, which may be particularly advantageous when, for example, the hair of an animal is being brushed using a brushing element of the animal cleaning device.

Further, in one or more embodiments described herein, an animal cleaning tool and fluid supply unit may be provided that may be portable and have one or more brushing elements that brush through an animal's hair or fur or outer coat and one or more openings for dispensing cleaning products and/or flowing air (which may or may not be heated) over a surface of an animal. By making a unit that is portable, a user may be enable to clean and maintain the hygiene of his or an animal, such as a household pet, with much greater frequency and regularity. Thus, even if a user and an animal are not located in the same location, a portable cleaning tool and/or portable unit may enable a user to wash and maintain the hygiene of the animal at any location. This may benefit users by eliminating or reducing the unpleasant odors and germs associated with unclean animals, and may encourage individuals, as well as couples and/or families, to look forward to spending quality time with their animals. Thus, one or more embodiments of the animal cleaning tool provides a number of benefits and solutions to long felt needs and problems that have plagued animal owners and in particular, pet owners for a long while.

The detailed description of the illustrative embodiments above is described in sufficient detail to enable those skilled in the art to practice the invention. To avoid unnecessary detail, the description may have omitted certain information known to those skilled in the art.

Although the illustrative embodiments described herein have been disclosed in the context of certain illustrative, non-limiting embodiments, it should be understood that various changes, substitutions, permutations, and alterations can be made without departing from the scope of the invention as defined by the appended claims. Any feature that is described in connection to any one embodiment may also be applicable to any other embodiment. It is also understood that other embodiments may be utilized and that logical structural, mechanical, and chemical changes may be made without departing from the spirit or scope of the invention.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. An animal cleaning device for grooming an animal, comprising:
   a top portion comprising a plurality of actuators;
   a bottom portion affixed to the top portion, the bottom portion comprising:
      a suction vent;
      a blow vent;
      a heated airflow vent;
      a brush; and
      a formulation dispenser; and
   a fluid supply base unit coupled to one selected from a group consisting of the top portion and the bottom portion of the animal cleaning device,
   wherein the fluid supply base unit comprises a speed-controlled motor and
   the speed-controlled motor is configured to:
      begin operation at a lower rotational speed corresponding to a lower motor volume; and
      increase automatically, after beginning operation at a lower rotational speed, to a higher rotational speed corresponding to a higher motor volume, and
   wherein at least one actuator of the plurality of actuators of the animal cleaning device is configured to begin operation of the speed-controlled motor.

2. The animal cleaning device of claim 1, where an actuator of the plurality of actuators is configured to operate the suction vent.

3. The animal cleaning device of claim 2, wherein operation of the suction vent comprises taking air into the animal cleaning device.

4. The animal cleaning device of claim 2, wherein operation of the suction vent comprises creating a negative pressure relative to an ambient pressure in a vicinity of the animal cleaning device.

5. The animal cleaning device of claim 2, wherein the suction vent is configured to vacuum from a surface of an animal one selected from a group consisting of a fluid and an item.

6. The animal cleaning device of claim 1, where an actuator of the plurality of actuators is configured to operate the blow vent.

7. The animal cleaning device of claim 6, wherein the blow vent is configured to remove from a surface of an animal one selected from a group consisting of a fluid and an item.

8. The animal cleaning device of claim 1, where an actuator of the plurality of actuators is configured to operate the heated airflow vent.

9. The animal control device of claim 1, wherein an actuator of the plurality of actuators is configured to control a temperature of air output from the heated airflow vent.

10. The animal control device of claim 9, wherein the actuator is configured to control the temperature of the air by allowing water from a water reservoir into an air flow of the air.

11. The animal control device of claim 1, wherein the blow vent and the heated airflow vent of the animal control device are a same opening in the bottom portion of the animal control device.

12. The animal cleaning device of claim 1, wherein the brush is a rotating brush, and an actuator of the plurality of actuators is configured to operate the rotating brush.

13. The animal cleaning device of claim 12, wherein the actuator is further configured to control a direction of rotation of the rotating brush.

14. The animal cleaning device of claim 12, wherein the actuator is further configured to control a speed of rotation of the rotating brush.

15. The animal cleaning device of claim 1, where an actuator of the plurality of actuators is configured to operate the formulation dispenser.

16. The animal cleaning device of claim 15, wherein operation of the formulation dispenser causes a formulation to be dispensed.

17. The animal cleaning device of claim 16, wherein the formulation comprises a weight percentage of water of less than fifty.

18. The animal control device of claim 1, wherein an actuator of the plurality of actuators is configured to control a temperature of formulation output from the formulation dispenser.

* * * * *